(12) United States Patent
Silverbrook

(10) Patent No.: US 7,936,483 B2
(45) Date of Patent: *May 3, 2011

(54) DIGITAL PHOTO FRAME WITH ROTATABLE SCREEN

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,011

(22) Filed: Feb. 2, 2010

(65) Prior Publication Data

US 2010/0134845 A1  Jun. 3, 2010

Related U.S. Application Data

(63) Continuation of application No. 11/518,244, filed on Sep. 11, 2006, now Pat. No. 7,663,784.

(51) Int. Cl.
*H04N 1/21* (2006.01)

(52) U.S. Cl. ........ 358/302; 358/1.16; 345/649; 345/659

(58) Field of Classification Search .................. 358/302, 358/1.12, 1.13, 1.15, 1.16, 1.17; 345/204, 345/649, 659, 10, 11; 348/333.06
See application file for complete search history.

(56) References Cited

U.S. PATENT DOCUMENTS

| | | | |
|---|---|---|---|
| 5,973,664 A | 10/1999 | Badger | |
| 5,980,018 A | 11/1999 | Taylor et al. | |
| 5,986,634 A | 11/1999 | Alioshin et al. | |
| 6,597,384 B1 | 7/2003 | Harrison | |
| 7,236,271 B2 | 6/2007 | Silverbrook | |
| 7,249,822 B2 | 7/2007 | Silverbrook et al. | |
| 7,249,833 B2 | 7/2007 | Silverbrook et al. | |

(Continued)

FOREIGN PATENT DOCUMENTS

WO  WO 02/093902 A1  11/2002

OTHER PUBLICATIONS

Anonymous Selphy DS810 Compact Photo Printer Printing Guide downloaded from http://www.retrevo.com/support/Canon-DS810-Printers-manual/id/259ag516/t/2/.

(Continued)

*Primary Examiner* — Thomas D Lee

(57) ABSTRACT

A digital photo frame for storing and displaying photos. The photo frame has a photo-sized display screen rotatably mounted on a support such that the display screen is configurable in landscape-viewing or portrait-viewing orientations by rotation of the screen. A memory stores photo image files tagged as either landscape orientation or portrait orientation and a user interface receives instructions to display photos stored in the memory. A processor is configured for receiving orientation data regarding an orientation of the display screen, retrieving only photo image files from the memory that are tagged with an orientation corresponding to the orientation of the display screen, and displaying the retrieved photo image files as photos on the display screen.

6 Claims, 29 Drawing Sheets

U.S. PATENT DOCUMENTS

| | | |
|---|---|---|
| 7,259,772 B2 | 8/2007 | Koh |
| 7,270,494 B2 | 9/2007 | Silverbrook et al. |
| 7,284,816 B2 | 10/2007 | Silverbrook et al. |
| 7,300,140 B2 | 11/2007 | Silverbrook et al. |
| 7,303,268 B2 | 12/2007 | Silverbrook et al. |
| 7,438,399 B2 | 10/2008 | Silverbrook et al. |
| 7,467,853 B2 | 12/2008 | Knight et al. |
| 7,467,863 B2 | 12/2008 | Silverbrook et al. |
| 7,663,784 B2 * | 2/2010 | Silverbrook .................. 358/302 |
| 2005/0134568 A1 | 6/2005 | Hill et al. |
| 2005/0185205 A1 | 8/2005 | Eckhaus et al. |
| 2007/0126811 A1 | 6/2007 | Silverbrook et al. |

OTHER PUBLICATIONS

Anonymous, Derwent Abstract RD 509048 A, Sep. 10, 2006, See whole document.

CNET, Canon Selphy DS810, Jun. 12, 2005, Online, <http://reviews.cnet.com/Canon_Selphy_DS810/4505-3156_7-3475446.html> See whole document.

Sony, Sony Basic Operation Guide 2005, 2005, Online, <http://www.upcr101.com/BasicGuide(English).pdf> See whole document.

* cited by examiner

DIGITAL PHOTO FRAME WITH ROTATABLE SCREEN

CROSS REFERENCE TO RELATED APPLICATION

This application is a continuation of U.S. application Ser. No. 11/518,244 filed Sep. 11, 2006 all of which is herein incorporated by reference.

FIELD OF THE INVENTION

This invention relates to the display and printing of digital photos. It has been developed primarily to simplify the process of displaying, selecting and printing digital photos.

CO-PENDING APPLICATIONS

The following applications have been filed by the Applicant with the present application:
Ser. Nos. 11/518,238; 11/518,280; 11/518,243; 11/518,242
The disclosures of these co-pending applications are incorporated herein by reference.

CROSS REFERENCES TO RELATED APPLICATIONS

Various methods, systems and apparatus relating to the present invention are disclosed in the following US patents/patent applications filed by the applicant or assignee of the present invention:

| | | | | |
|---|---|---|---|---|
| 6,750,901 | 6,476,863 | 6,788,336 | 7,249,108 | 6,566,858 |
| 6,331,946 | 6,246,970 | 6,442,525 | 7,346,586 | 09/505,951 |
| 6,374,354 | 7,246,098 | 6,816,968 | 6,757,832 | 6,334,190 |
| 6,745,331 | 7,249,109 | 7,197,642 | 7,093,139 | 7,509,292 |
| 10/636,283 | 10/866,608 | 7,210,038 | 7,401,223 | 10/940,653 |
| 10/942,858 | 7,364,256 | 7,258,417 | 7,293,853 | 7,328,968 |
| 7,270,395 | 7,461,916 | 7,510,264 | 7,334,864 | 7,255,419 |
| 7,284,819 | 7,229,148 | 7,258,416 | 7,273,263 | 7,270,393 |
| 6,984,017 | 7,347,526 | 7,357,477 | 7,465,015 | 7,364,255 |
| 7,357,476 | 11/003,614 | 7,284,820 | 7,341,328 | 7,246,875 |
| 7,322,669 | 7,445,311 | 7,452,052 | 7,455,383 | 7,448,724 |
| 7,441,864 | 7,637,588 | 7,648,222 | 11/482,968 | 7,607,755 |
| 11/482,971 | 7,658,463 | 7,506,958 | 7,472,981 | 7,448,722 |
| 7,575,297 | 7,438,381 | 7,441,863 | 7,438,382 | 7,425,051 |
| 7,399,057 | 11/246,671 | 11/246,670 | 11/246,669 | 7,448,720 |
| 7,448,723 | 7,445,310 | 7,399,054 | 7,425,049 | 7,367,648 |
| 7,370,936 | 7,401,886 | 7,506,952 | 7,401,887 | 7,384,119 |
| 7,401,888 | 7,387,358 | 7,413,281 | 7,530,663 | 7,467,846 |
| 11/482,962 | 11/482,963 | 11/482,956 | 11/482,954 | 11/482,974 |
| 7,604,334 | 11/482,987 | 11/482,959 | 11/482,960 | 11/482,961 |
| 11/482,964 | 11/482,965 | 7,510,261 | 11/482,973 | 7,581,812 |
| 7,641,304 | 11/495,817 | 6,623,101 | 6,406,129 | 6,505,916 |
| 6,457,809 | 6,550,895 | 6,457,812 | 7,152,962 | 6,428,133 |
| 7,204,941 | 7,282,164 | 7,465,342 | 7,278,727 | 7,417,141 |
| 7,452,989 | 7,367,665 | 7,138,391 | 7,153,956 | 7,423,145 |
| 7,456,277 | 7,550,585 | 7,122,076 | 7,148,345 | 7,470,315 |
| 7,572,327 | 7,658,792 | 11/482,986 | 11/482,985 | 11/454,899 |
| 7,416,280 | 7,252,366 | 7,488,051 | 7,360,865 | 11/482,967 |
| 11/482,966 | 11/482,988 | 11/482,989 | 7,438,371 | 7,465,017 |
| 7,441,862 | 7,654,636 | 7,458,659 | 7,455,376 | 11/124,158 |
| 11/124,196 | 11/124,199 | 11/124,162 | 11/124,202 | 11/124,197 |
| 11/124,198 | 7,284,921 | 11/124,151 | 7,407,257 | 7,470,019 |
| 7,645,022 | 7,392,950 | 11/124,149 | 7,360,880 | 7,517,046 |
| 7,236,271 | 11/124,174 | 11/124,194 | 11/124,164 | 7,465,047 |
| 7,607,774 | 11/124,166 | 11/124,150 | 11/124,172 | 11/124,165 |
| 7,566,182 | 11/124,185 | 11/124,184 | 11/124,182 | 11/124,201 |
| 11/124,171 | 11/124,181 | 11/124,161 | 7,595,904 | 11/124,191 |
| 11/124,159 | 7,370,932 | 7,404,616 | 11/124,187 | 11/124,189 |
| 11/124,190 | 7,500,268 | 7,558,962 | 7,447,908 | 11/124,178 |

-continued

| | | | | |
|---|---|---|---|---|
| 7,661,813 | 7,456,994 | 7,431,449 | 7,466,444 | 11/124,179 |
| 11/124,169 | 11/187,976 | 11/188,011 | 7,562,973 | 7,530,446 |
| 11/228,540 | 11/228,500 | 11/228,501 | 11/228,530 | 11/228,490 |
| 11/228,531 | 11/228,504 | 11/228,533 | 11/228,502 | 11/228,507 |
| 11/228,482 | 11/228,505 | 7,641,115 | 11/228,487 | 7,654,444 |
| 11/228,484 | 7,499,765 | 11/228,518 | 11/228,536 | 11/228,496 |
| 7,558,563 | 11/228,506 | 11/228,516 | 11/228,526 | 11/228,539 |
| 11/228,538 | 11/228,524 | 11/228,523 | 7,506,802 | 11/228,528 |
| 11/228,527 | 7,403,797 | 11/228,520 | 7,646,503 | 11/228,511 |
| 11/228,522 | 11/228,515 | 11/228,537 | 11/228,534 | 11/228,491 |
| 11/228,499 | 11/228,509 | 11/228,492 | 7,558,599 | 11/228,510 |
| 11/228,508 | 11/228,512 | 11/228,514 | 11/228,494 | 7,438,215 |
| 11/228,486 | 7,621,442 | 7,575,172 | 7,357,311 | 7,380,709 |
| 7,428,986 | 7,403,796 | 7,407,092 | 11/228,513 | 7,637,424 |
| 7,469,829 | 11/228,535 | 7,558,597 | 7,558,598 | 6,238,115 |
| 6,386,535 | 6,398,344 | 6,612,240 | 6,752,549 | 6,805,049 |
| 6,971,313 | 6,899,480 | 6,860,664 | 6,925,935 | 6,966,636 |
| 7,024,995 | 7,284,852 | 6,926,455 | 7,056,038 | 6,869,172 |
| 7,021,843 | 6,988,845 | 6,964,533 | 6,981,809 | 7,284,822 |
| 7,258,067 | 7,322,757 | 7,222,941 | 7,284,925 | 7,278,795 |
| 7,249,904 | 7,152,972 | D529952 | 6,746,105 | 11/246,687 |
| 7,645,026 | 7,322,681 | 11/246,686 | 11/246,703 | 11/246,691 |
| 7,510,267 | 7,465,041 | 11/246,712 | 7,465,032 | 7,401,890 |
| 7,401,910 | 7,470,010 | 11/246,702 | 7,431,432 | 7,465,037 |
| 7,445,317 | 7,549,735 | 7,597,425 | 7,661,800 | 11/246,667 |
| 7,156,508 | 7,159,972 | 7,083,271 | 7,165,834 | 7,080,894 |
| 7,201,469 | 7,090,336 | 7,156,489 | 7,413,283 | 7,438,385 |
| 7,083,257 | 7,258,422 | 7,255,423 | 7,219,980 | 7,591,533 |
| 7,416,274 | 7,367,649 | 7,118,192 | 7,618,121 | 7,322,672 |
| 7,077,505 | 7,198,354 | 7,077,504 | 7,614,724 | 7,198,355 |
| 7,401,894 | 7,322,676 | 7,152,959 | 7,213,906 | 7,178,901 |
| 7,222,938 | 7,108,353 | 7,104,629 | 7,455,392 | 7,370,939 |
| 7,429,095 | 7,404,621 | 7,261,401 | 7,461,919 | 7,438,388 |
| 7,328,972 | 7,322,673 | 7,303,930 | 7,401,405 | 7,464,466 |
| 7,464,465 | 7,246,886 | 7,128,400 | 7,108,355 | 6,991,322 |
| 7,287,836 | 7,118,197 | 7,575,298 | 7,364,269 | 7,077,493 |
| 6,962,402 | 10/728,803 | 7,147,308 | 7,524,034 | 7,118,198 |
| 7,168,790 | 7,172,270 | 7,229,155 | 6,830,318 | 7,195,342 |
| 7,175,261 | 7,465,035 | 7,108,356 | 7,118,202 | 7,510,269 |
| 7,134,744 | 7,510,270 | 7,134,743 | 7,182,439 | 7,210,768 |
| 7,465,036 | 7,134,745 | 7,156,484 | 7,118,201 | 7,111,926 |
| 7,431,433 | 7,018,021 | 7,401,901 | 7,468,139 | 7,128,402 |
| 7,387,369 | 7,484,832 | 11/490,041 | 7,506,968 | 7,284,839 |
| 7,246,885 | 7,229,156 | 7,533,970 | 7,467,855 | 7,293,858 |
| 7,448,729 | 7,246,876 | 7,431,431 | 7,419,249 | 7,377,623 |
| 7,328,978 | 7,334,876 | 7,147,306 | 7,654,645 | 11/482,977 |
| 10/727,181 | 10/727,162 | 7,377,608 | 7,399,043 | 7,121,639 |
| 7,165,824 | 7,152,942 | 10/727,157 | 7,181,572 | 7,096,137 |
| 7,302,592 | 7,278,034 | 7,188,282 | 7,592,829 | 10/727,180 |
| 10/727,179 | 10/727,192 | 10/727,274 | 10/727,164 | 7,523,111 |
| 7,573,301 | 7,660,998 | 10/754,536 | 10/754,938 | 10/727,160 |
| 7,171,323 | 7,278,697 | 7,360,131 | 7,519,772 | 7,328,115 |
| 7,369,270 | 6,795,215 | 7,070,098 | 7,154,638 | 6,805,419 |
| 6,859,289 | 6,977,751 | 6,398,332 | 6,394,573 | 6,622,923 |
| 6,747,760 | 6,921,144 | 10/884,881 | 7,092,112 | 7,192,106 |
| 7,457,001 | 7,173,739 | 6,986,560 | 7,008,033 | 7,551,324 |
| 7,222,780 | 7,270,391 | 7,525,677 | 7,388,689 | 7,571,906 |
| 7,195,328 | 7,182,422 | 7,374,266 | 7,427,117 | 7,448,707 |
| 7,281,330 | 10/854,503 | 7,328,956 | 10/854,509 | 7,188,928 |
| 7,093,989 | 7,377,609 | 7,600,843 | 10/854,498 | 10/854,511 |
| 7,390,071 | 10/854,525 | 10/854,526 | 7,549,715 | 7,252,353 |
| 7,607,757 | 7,267,417 | 10/854,505 | 7,517,036 | 7,275,805 |
| 7,314,261 | 7,281,777 | 7,290,852 | 7,484,831 | 10/854,523 |
| 10/854,527 | 7,549,718 | 10/854,520 | 7,631,190 | 7,557,941 |
| 10/854,499 | 10/854,501 | 7,266,661 | 7,243,193 | 10/854,518 |
| 10/934,628 | 7,163,345 | 7,322,666 | 7,465,033 | 7,452,055 |
| 7,470,002 | 11/293,833 | 7,475,963 | 7,448,735 | 7,465,042 |
| 7,448,739 | 7,438,399 | 11/293,794 | 7,467,853 | 7,461,922 |
| 7,465,020 | 11/293,830 | 7,461,910 | 11/293,828 | 7,270,494 |
| 7,632,032 | 7,475,961 | 7,547,088 | 7,611,239 | 11/293,819 |
| 11/293,818 | 11/293,817 | 11/293,816 | 11/482,978 | 7,448,734 |
| 7,425,050 | 7,364,263 | 7,201,468 | 7,360,868 | 7,234,802 |
| 7,303,255 | 7,287,846 | 7,156,511 | 10/760,264 | 7,258,432 |
| 7,097,291 | 7,645,025 | 10/760,248 | 7,083,273 | 7,367,647 |
| 7,374,355 | 7,441,880 | 7,547,092 | 10/760,206 | 7,513,598 |
| 10/760,270 | 7,198,352 | 7,364,264 | 7,303,251 | 7,201,470 |
| 7,121,655 | 7,293,861 | 7,232,208 | 7,328,985 | 7,344,232 |
| 7,083,272 | 7,311,387 | 7,621,620 | 11/014,763 | 7,331,663 |
| 7,360,861 | 7,328,973 | 7,427,121 | 7,407,262 | 7,303,252 |
| 7,249,822 | 7,537,309 | 7,311,382 | 7,360,860 | 7,364,257 |

-continued

| | | | | |
|---|---|---|---|---|
| 7,390,075 | 7,350,896 | 7,429,096 | 7,384,135 | 7,331,660 |
| 7,416,287 | 7,488,052 | 7,322,684 | 7,322,685 | 7,311,381 |
| 7,270,405 | 7,303,268 | 7,470,007 | 7,399,072 | 7,393,076 |
| 11/014,750 | 7,588,301 | 7,249,833 | 7,524,016 | 7,490,927 |
| 7,331,661 | 7,524,043 | 7,300,140 | 7,357,492 | 7,357,493 |
| 7,566,106 | 7,380,902 | 7,284,816 | 7,284,845 | 7,255,430 |
| 7,390,080 | 7,328,984 | 7,350,913 | 7,322,671 | 7,380,910 |
| 7,431,424 | 7,470,006 | 7,585,054 | 7,347,534 | 7,441,865 |
| 7,469,989 | 7,367,650 | 7,469,990 | 7,441,882 | 7,556,364 |
| 7,357,496 | 7,467,863 | 7,431,440 | 7,431,443 | 7,527,353 |
| 7,524,023 | 7,513,603 | 7,467,852 | 7,465,045 | 7,645,034 |
| 7,637,602 | 7,645,033 | 7,661,803 | 11/495,819 | |

The disclosures of these applications and patents are incorporated herein by reference.

BACKGROUND TO THE INVENTION

Digital photography has become a part of everyday life. Over the past decade or so, users have been provided with an increasing array of functionality in both their digital cameras and in the options available for downstream processing of their digital photos. For example, users now have a myriad of software applications, which may be used to manipulate their photos.

Paradoxically, many users are overwhelmed and confused by the increasing functionality offered by these new technologies. For these users, who still wish to enjoy the benefits of digital photography, there is a need for simpler means of processing and printing their photos once they have been captured on their cameras.

At present, there are a number of options available for users who wish to display and print their photos. Typically, once a user captures a set of images on his digital camera, he uploads them onto a computer for storage, manipulation and processing. Some users enjoy using photo editing applications for manipulation of their photos; many simply wish to organize their photos into a format that can be displayed and/or printed. Typically, this involves selecting their favorite images from a set, saving these images into a folder, and optionally saving these selected images onto a CD, DVD or other memory device.

There are various display options for users who do not wish to print photos. The photos may be viewed directly on a computer screen. Another option is to view photos saved onto a CD or DVD using a home DVD player.

There are also various printing options. Some users may take their CD, DVD or other memory device into a high street digital photo shop for printing their photos. Other users may prefer to print their photos at home using a color inkjet printer.

Given the recognition in the art that many users enjoy simplicity over functionality, there are some commercially available options, which remove the need for processing photos on a PC.

PictBridge printers allow images to be printed directly from a digital camera to a printer, without having to connect the camera to a computer. By connecting a PictBridge-enabled printer to a PictBridge-enabled camera using a single USB cable, users can easily control print settings using their camera and produce high quality photos without using a PC. A major advantage of PictBridge printing is its simplicity for the user, and especially those users for whom complex photo application software may be a barrier.

However, a disadvantage of current PictBridge printers is that users must select photos for printing using the display screen on their cameras. Whilst digital camera display screens have increased in size over the years, they will never be able to replicate a standard 6"×4" photo, because digital cameras are required to be pocket-sized. Accordingly, it is difficult for users to properly view an image on their camera display screen prior to printing. It is especially difficult to see if a particular image is in focus, which is a major selection criteria for printing photos. This inherent disadvantage of PictBridge printing results in many unwanted photos being printed.

Alternatively, digital photo frames (or digital picture frames) were developed in recognition of the fact that users tend to print fewer photos using digital photography. A digital photo frame comprises a frame having a display screen (e.g. LCD screen) of about the same size and shape as an ordinary picture frame. Digital photo frames display images often directly from a memory card (or other flash memory device) in high resolution. Most digital photo frames also have the ability to display slide shows or short movies. Examples of digital photo frame manufacturers are Ceiva, Nikon, Polaroid and Kodak.

However, whilst digital photo frames conveniently allow the display of photos, without the need for a PC, a user who wishes to print their favourite photos from a set of images is still required to select these photos and print them off. The user could remember which photos are his favourites, insert the memory card back into his camera and print his favourite photos using a PictBridge printer. This is obviously a somewhat laborious procedure. Otherwise, the user has to resort to file management via his PC, and prepare a new folder containing his favorite photos for printing. Clearly, this is undesirable for users who purchased a digital photo frame wishing to avoid using a PC.

In view of the above, it would be desirable to provide users with a simple means for conveniently displaying digital photos, whilst allowing selected photos to be printed when required. It would be further desirable to achieve this goal without the need for a computer or the use of photo editing or photo management applications.

It would also be desirable to provide an improved PictBridge printer, which provides users with improved options for selecting photos for printing, without the need for a computer or the use of photo editing or photo management applications.

It would also be desirable to provide users with simpler or more intuitive methods for printing than those methods currently used. It would be further desirable, from a commercial point of view, if such methods encouraged users to print more photos.

SUMMARY OF THE INVENTION

In a first aspect, there is provided a digital photo frame comprising:
a photo-sized display screen;
an internal memory for storing photo image files;
an interface for communication with an external memory device;
an integral inkjet printer for printing photos displayed on the display screen; and
a processor communicating with the display screen, the internal memory, the interface and the printer.

Optionally, the display screen has a length of at least 5 inches and/or a width of at least 3.5 inches.

Optionally, the display screen is mounted on a support configured for viewing photos displayed on the screen.

Optionally, the display screen is rotatably mounted on the support.

Optionally, the display screen is configurable in landscape-viewing or portrait-viewing orientations by rotation of the screen.

Optionally, the support comprises a base and mounting arm extending therefrom, the display screen being mounted on the mounting arm.

Optionally, the digital photo frame comprises a memory card interface.

Optionally, the digital photo frame comprises one or more USB ports for receiving: a removable flash memory device or a USB cable connected to a digital camera.

Optionally, the processor is configured for transferring photo image files from the external memory device to the internal memory.

Optionally, the digital photo frame comprises a user interface in communication with the processor, the user interface enabling a user to perform any one of the following functions:
  (i) select a display mode;
  (ii) select a photo-printing mode;
  (iii) print a displayed photo;
  (iv) store a displayed photo in the internal memory as either a landscape-oriented photo or a portrait-oriented photo.

Optionally, the processor is configured to provide a display mode and a photo-printing mode.

Optionally, in the display mode, photos stored in the internal memory are displayed on the display screen.

Optionally, in the photo-printing mode, photos stored on an external memory device connected to the interface are displayed on the display screen.

Optionally, the photos are displayed as a slideshow.

Optionally, the digital photo frame is configured to print a displayed photo upon actuation of a print button during the slideshow.

Optionally, a period for displaying each photo during the slideshow is about equal to a period required for printing the photo.

Optionally, the period is in the range of 1 to 3 seconds.

Optionally, only photos stored as landscape-oriented photos are displayed when the display screen is configured for landscape-viewing. Optionally, only photos stored as portrait-oriented photos are displayed when the display screen is configured for portrait-viewing.

Optionally, the printer comprises a photo-width printhead.

Optionally, the printer comprises a dedicated print engine controller for controlling the printhead, the print engine controller communicating with the processor.

In a second aspect, there is provided a PictBridge printer comprising:
a printer housing;
an inkjet printer contained in the housing;
a PictBridge interface for communication with a PictBridge-enabled digital camera;
a photo display screen associated with the housing; and
a processor contained in the housing for communicating with the display screen, the PictBridge interface and the inkjet printer,
wherein the processor and the inkjet printer are configured for printing photos displayed on the display screen.

Optionally, the display screen is photo-sized. Optionally, the display screen has a length of at least 5 inches and a width of at least 3.5 inches.

Optionally, the display screen is a flip-up display screen.

Optionally, the display screen is hingedly mounted on the printer housing.

Optionally, the PictBridge printer comprises an internal memory for storing photo image files.

Optionally, the PictBridge printer comprises an interface for communication with an external memory device.

Optionally, the PictBridge printer comprises a memory card interface.

Optionally, the PictBridge printer comprises one or more USB ports for receiving: a removable flash memory device or a USB cable connected to a digital camera.

Optionally, the processor is configured for transferring photo image files from the external memory device or the camera to the internal memory.

Optionally, the PictBridge printer comprises a user interface in communication with the processor, the user interface enabling a user to perform any one of the following functions:
  (i) select a display mode;
  (iii) select a photo-printing mode;
  (iii) print a displayed photo.

Optionally, the processor is configured to provide a display mode.

Optionally, in the display mode, photos stored in the internal memory are displayed on the display screen.

Optionally, the processor is configured to provide a photo-printing mode.

Optionally, in the photo-printing mode, photos stored in a camera or in an external memory device connected to the interface are displayed on the display screen.

Optionally, the photos are displayed as a slideshow.

Optionally, the PictBridge printer is configured to print a displayed photo upon actuation of a print button during the slideshow.

Optionally, a period for displaying each photo during the slideshow is about equal to a period required for printing the photo.

Optionally, the period is in the range of 1 to 3 seconds.

Optionally, the inkjet printer comprises a photo-width printhead.

Optionally, the inkjet printer comprises a dedicated print engine controller for controlling the printhead, the print engine controller communicating with the processor.

Optionally, the PictBridge printer comprises a photo print media supply, the supply being contained in the housing.

In a third aspect, there is provided a method of storing and displaying photos on a digital photo frame, the digital photo frame having a photo-sized display screen rotatably mounted on a support such that the display screen is configurable in landscape-viewing or portrait-viewing orientations by rotation of the screen, the method comprising the steps of:
storing photo image files tagged as either landscape orientation or portrait orientation in an internal memory of said digital photo frame;
receiving an instruction to display photos stored in said internal memory;
determining an orientation of said display screen; retrieving only photo image files from said internal memory that are tagged with an orientation corresponding to the orientation of said display screen; and
displaying said retrieved photo image files as photos on said display screen.

Optionally, the photo image files are stored by a method comprising the steps of:
identifying a tag associated with each photo image file, said tag indicating the orientation of the photo; and
storing the photo image files in said internal memory in accordance with information contained in said tag.

Optionally, the photo image files are stored by a method comprising the steps of:
displaying photo image files stored in an external memory device on said display screen;

selecting a landscape-orientation or a portrait-orientation for each displayed photo via a user interface associated with said digital photo frame;

tagging the corresponding photo image file as either landscape format or portrait format in accordance with orientation data received from said user interface; and transferring the tagged photo image files to the internal memory.

Optionally, the display screen has a length of at least 5 inches and a width of at least 3.5 inches.

Optionally, the method comprises the further step of:
rotating the display screen into a desired orientation.

Optionally, the digital photo frame comprises an integral inkjet printer for printing photos displayed on the display screen.

Optionally, the method comprises the further step of:
receiving a print instruction from a user interface associated with the digital photo frame; and
printing the photo displayed on the display screen at the time when the print instruction is received.

Optionally, the photos are displayed as a slideshow.

Optionally, a period for displaying each photo during the slideshow is about equal to a period required for printing the photo.

Optionally, the slideshow continues irrespective of whether a print instruction is received.

Optionally, the period is in the range of 1 to 3 seconds.

Optionally, the printer comprises a photo-width printhead.

In a fourth aspect, there is provided a method of printing photos from a photo-viewing device, the photo-viewing device comprising a photo display screen, an internal memory and an integral inkjet printer, the method comprising the steps of:

displaying photos stored in the internal memory as a slideshow on the display screen;
receiving a print instruction from a user interface associated with the device; and
printing the photo displayed on the display screen at the time when the print instruction is received.

Optionally, the photo-viewing device is a PictBridge printer having a photo display screen.

Optionally, the photo-viewing device is a digital photo frame.

Optionally, the display screen has a length of at least 5 inches and a width of at least 3.5 inches.

Optionally, the slideshow continues irrespective of whether a print instruction is received.

Optionally, a period for displaying each photo during the slideshow is about equal to a period required for printing the photo.

Optionally, the period is in the range of 1 to 3 seconds.

Optionally, the printer comprises a photo-width printhead.

Optionally, the display screen is a flip-up screen associated with a housing of the PictBridge printer.

Optionally, the display screen is hingedly mounted on the housing.

Optionally, the display screen is rotatably mounted on a support such that the display screen is configurable in landscape-viewing or portrait-viewing orientations by rotation of the screen.

Optionally, the step of displaying the photos as a slideshow comprises:
determining an orientation of the display screen;
retrieving only photo image files from the internal memory that are tagged with an orientation corresponding to the orientation of the display screen; and
displaying the retrieved photo image files as a slideshow on the display screen.

In a fifth aspect, there is provided a method of printing photos from a printer, the method comprising the steps of:
identifying a plurality of photo images files contained in a memory associated with the printer, each photo image file having an associated time and date of image capture;
receiving an instruction to print all the photos contained in the memory;
printing the photos in reverse chronological order, starting from the most recently captured image; and
continuing to print the photos until an instruction to stop printing is received.

Optionally, the memory is an internal memory of the printer.

Optionally, the memory is an external memory device in communication with the printer.

Optionally, the external memory device is selected from any one of: a memory card, a flash memory device, and a digital camera.

Optionally, the instructions to start printing and stop printing are received from a user interface associated with the printer.

Optionally, the printer is a PictBridge printer.

Optionally, the printer is an integral printer of a digital photo frame.

BRIEF DESCRIPTION OF THE DRAWINGS

Specific forms of the present invention will be now be described in detail, with reference to the following drawings, in which:—

DETAILED DESCRIPTION OF THE INVENTION

Digital Photo Frame with Integral Printer

Figure 1:
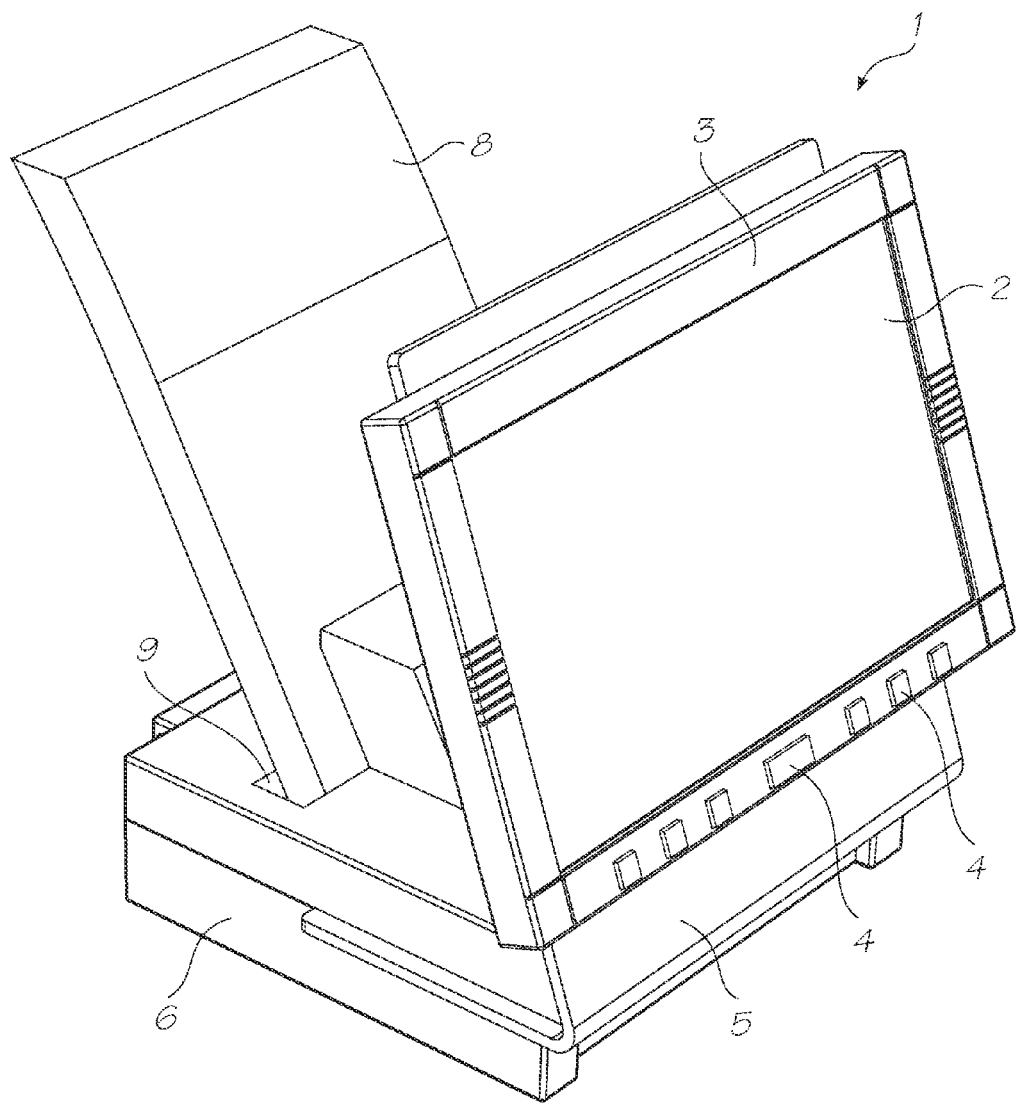
FIG. 1 is front perspective view of a digital photo frame according to the first aspect, with the display screen in its landscape orientation.
Figure 2:
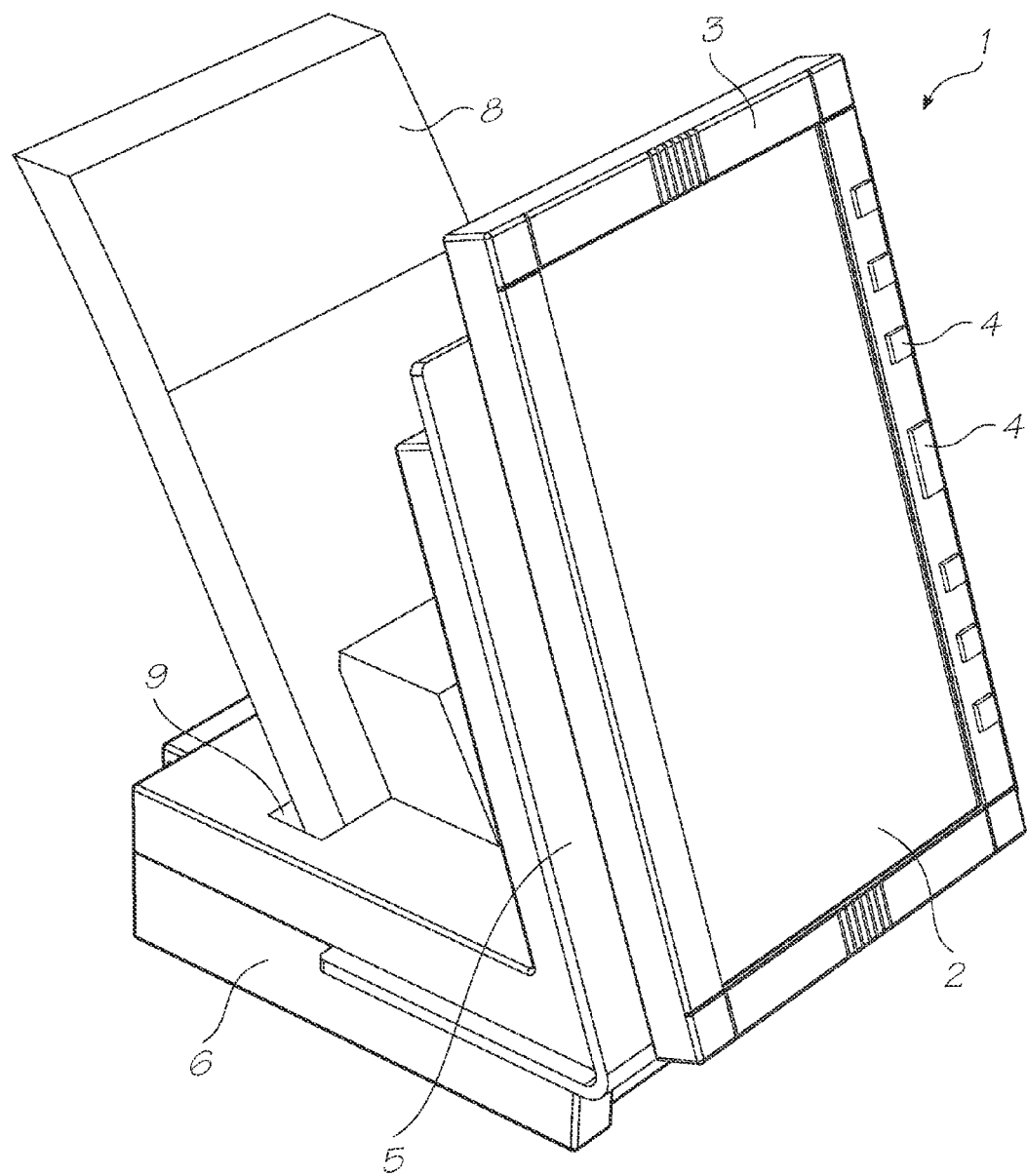
FIG. 2 is a front perspective view of the digital photo frame shown in FIG. 1, with the display screen rotated into its portrait orientation.

FIG. 1 shows a digital photo frame 1 according to the first aspect of the present invention. The digital photo frame 1 comprises a photo-sized LCD screen 2 surrounded by a frame 3. The frame 3 has a user interface in the form of a plurality of buttons 4 positioned along its bottom edge. The screen 2 is rotatably mounted on a support 5, which allows the screen to be configured in either a landscape orientation (as shown in FIG. 1) or a portrait orientation (as shown in FIG. 2). The screen 2 and/or the support 5 may have sensors suitable for determining the relative orientation of the screen.

Figure 3:
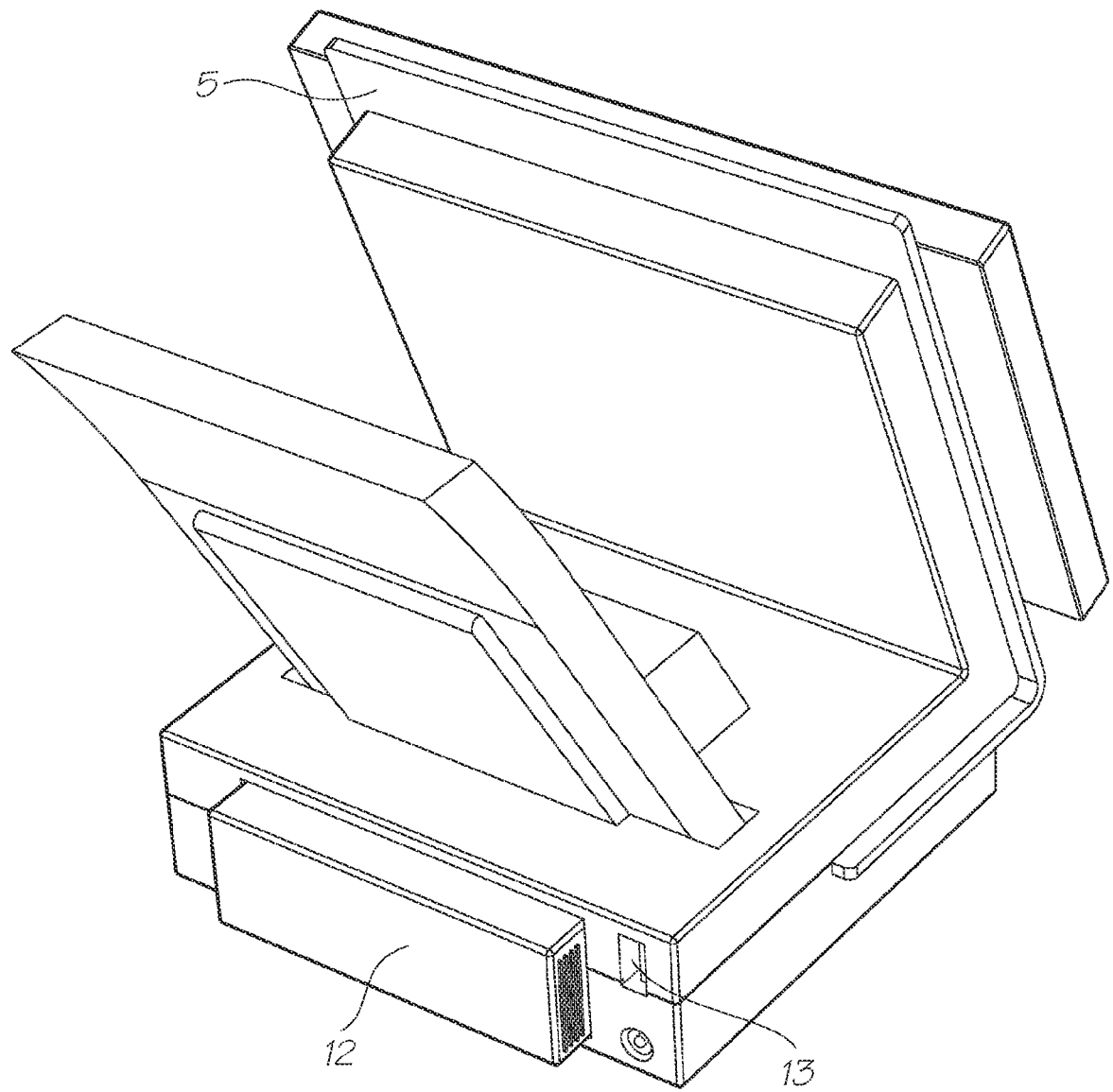
FIG. 3 is rear perspective view of the digital photo frame shown in FIG. 1.

The support 5 is fixed to a base 6, which houses an inkjet photo printer for printing photos displayed on the screen 2, and an internal non-volatile memory for storing photo image files. Referring to FIG. 3, the base has a USB interface 13 for communicating with external memory devices (not shown), such as a flash memory device (e.g. memory stick) or a USB cable connecting the photo frame 1 to a PictBridge-enabled digital camera. Like standard digital photo frames, photo image files stored on a portable memory device may be loaded into the internal memory of the photo frame 1 by interfacing with the USB interface 13. There is also shown a memory card interface 12 for interfacing with a memory card in a similar manner.

A processor is housed in the base 6 and communicates with the display screen 2, the internal memory, the interfaces 12 and 13 and the inkjet printer. As shown in FIGS. 1-3, a stack of paper 8 (e.g. photo paper) is fed to the inkjet printer housed in the base 6 via a slot 9 in the base.

Figure 4:
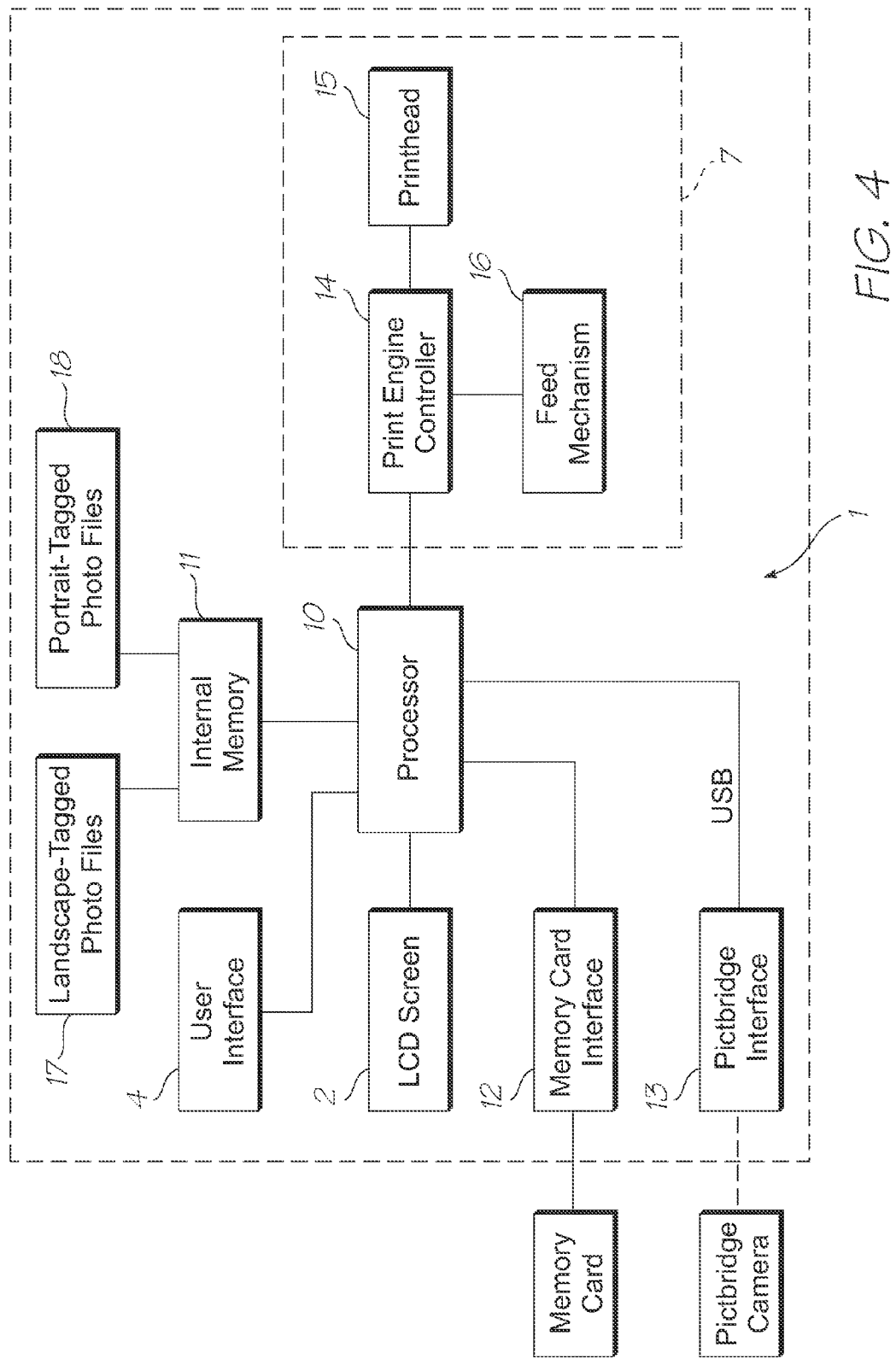
FIG. 4 shows the components of a digital photo frame according to the first aspect.

Referring now to FIG. 4, the block diagram shows the interrelationship of the various components of the digital photo frame 1 in more detail. The processor 10 is a standard DSP configured for communicating with the printer 7, the LCD screen 2, the internal memory 11, the memory card interface 12, the user interface 4 and the PictBridge interface 13. Hence, the processor 10 coordinates the various functions of the digital photo frame 1.

When, for example, a PictBridge-enabled camera is connected to the PictBridge interface 13, the processor 10 may be configured to automatically transfer photo image files stored in the camera's memory card to the internal memory 11. Alternatively, this data transfer may be initiated by an instruction from either the user interface 4 or a user interface on the camera.

When transferring photo image files to the internal memory 11, a user may select, via the user interface 4, a portrait format or a landscape format for each photo, depending on the orientation of a particular photo. The corresponding photo image file is then tagged accordingly and stored in the internal memory 11. The portrait or landscape tag allows photo image files of one orientation only to be retrieved from the internal memory. Hence, depending on the orientation of the LCD screen 2, the processor 10 can retrieve and display photos captured in an orientation corresponding to the orientation of the screen 2.

In a "photo-printing mode", the processor communicates with an external memory device via interface 12 or 13, and the processor 10 instructs the LCD screen 2 to display each photo individually. With a photo displayed on the screen 2, a user can select, via the user interface 4, to either print the photo or move on to the next photo stored on the external memory device.

Upon receipt of an instruction to print, the processor 10 instructs the printer 7 to print the displayed photo. The printer 7 comprises a print engine controller 14, which communicates with the processor 10 and controls operation of a photo-width printhead 15 and feed mechanism 16.

The processor 10 can also configure the photo frame 1 in a "display mode" where no external memory devices are connected to the interfaces 12 or 13. In the display mode, photo image files stored in the internal memory 11 are retrieved and displayed, typically as a slideshow, on the LCD screen. The LCD screen 2 may communicate its orientation (portrait or landscape) to the processor 10, and the processor can be configured to retrieve only photo image files tagged with a corresponding orientation.

During the slideshow in the display mode, a user can also request photos to be printed by pressing a print button on the user interface 4. If the processor 10 receives a print instruction, the slideshow continues while the photo is printed. The processor 10 coordinates the slideshow to display photos for about the same amount of time it takes to print a photo. This time period may be about 1, 2 or 3 seconds. Hence, photos may be generated at the same rate as the slideshow displays photos, providing users with a facile means for selecting and printing photos via the user interface 4 during a slideshow.

It will be appreciated that the digital photo frame described above advantageously facilitates the displaying and printing of photos without the need for a separate PC. Moreover, since photos are viewed on a photo-sized display screen, as opposed to a digital camera screen, users are able to select more easily which photos they wish to print. For example, users can readily determine if a photo is in focus, which they cannot do when viewing an image displayed on a digital camera screen.

PictBridge Printer with Photo Display Screen

Figure 5:
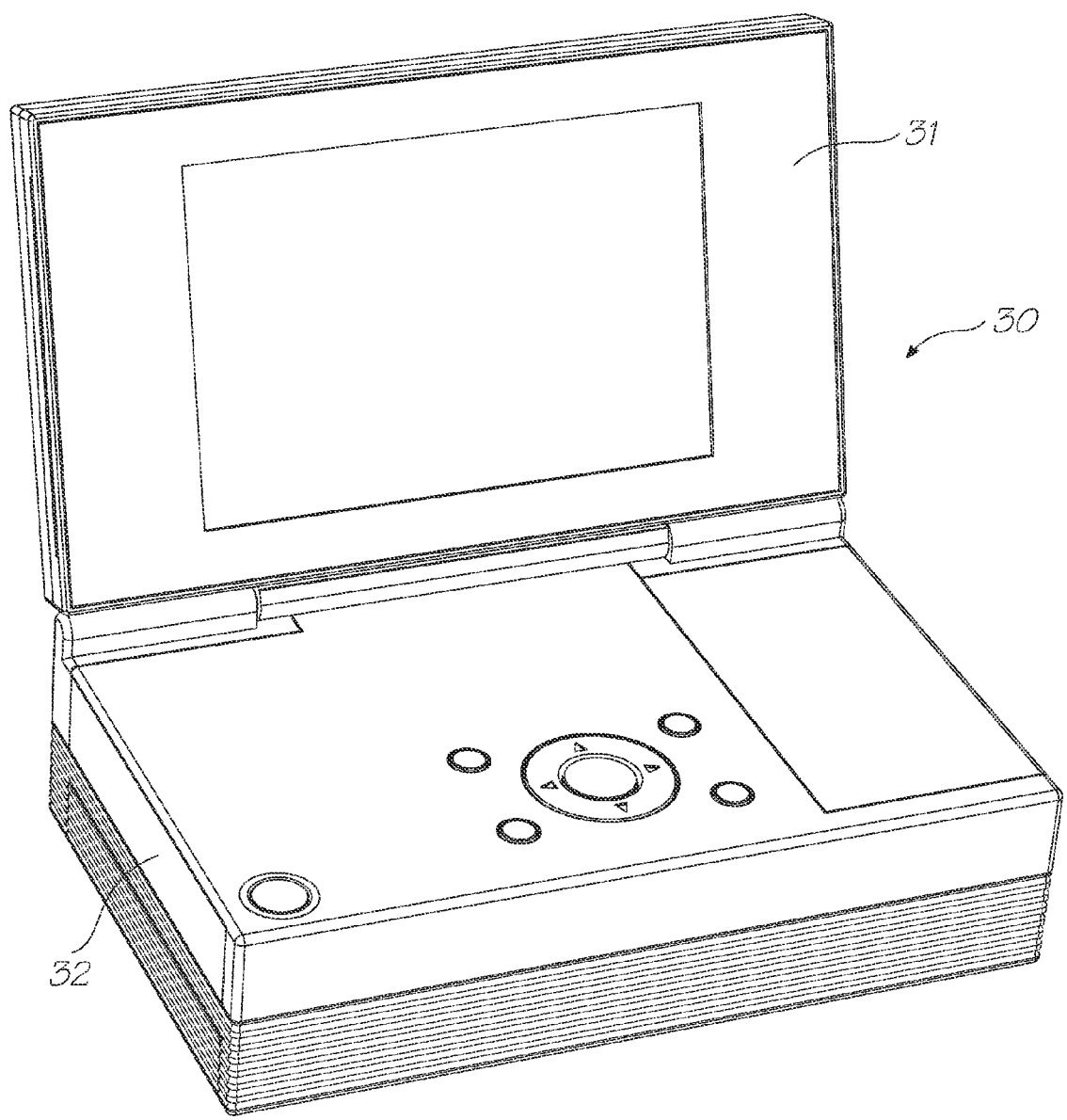
FIG. 5 is a front perspective view of a PictBridge printer according to the second aspect with display screen flipped open.
Figure 6:
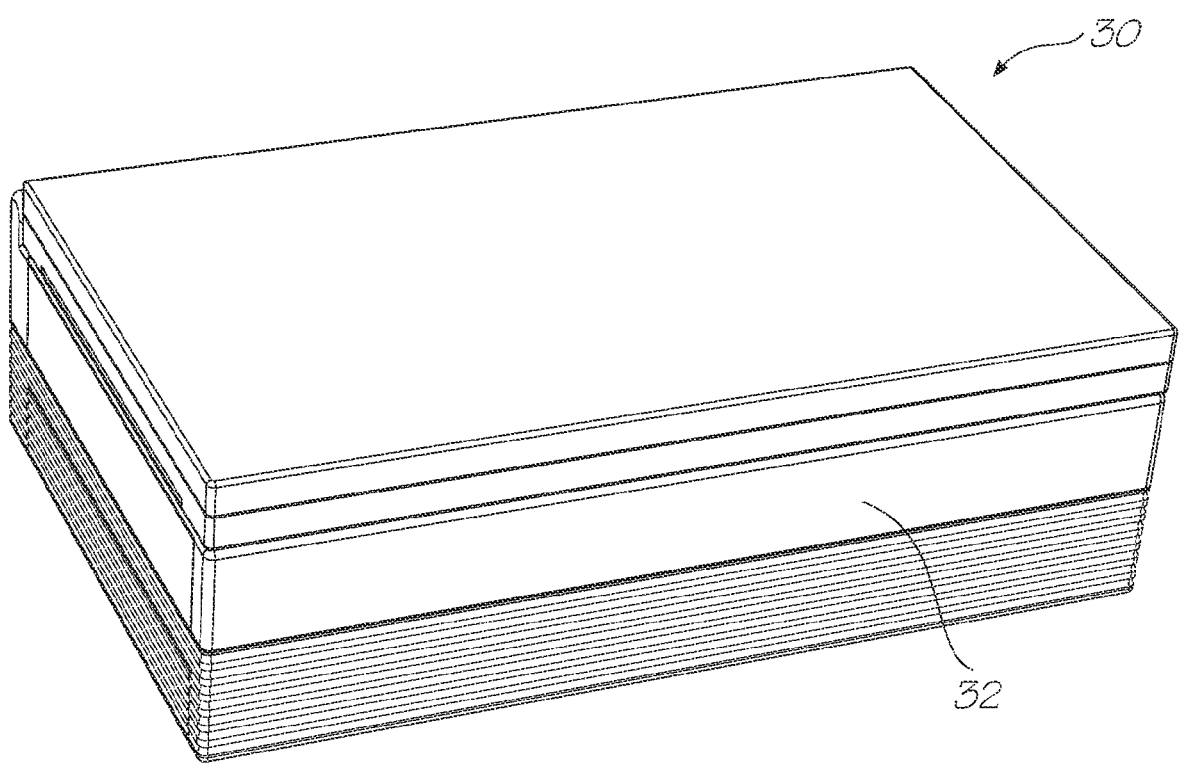
FIG. 6 is front perspective view of the PictBridge printer shown in FIG. 5 with display screen closed.

FIGS. 5 and 6 show a PictBridge printer 30 having a photo display screen 31. The display screen 31 approximates the size of a standard 6"×4" photo and is hingedly mounted to a housing 32 of the printer 30. In use, a user flips up the screen 31 and views photos for printing. In its closed position, shown in FIG. 6, the back side of the screen 31 becomes a lid for the printer 30.

The PictBridge printer 30 contains all the components described above in connection with FIG. 4, and functions similarly to the digital photo frame 1 described above. Hence, the PictBridge printer 30 can operate either as a display unit, as a printer or both. Further, the PictBridge printer 30 can operate in the photo-printing modes and display modes described above. The skilled person will understand the equivalent functionalities of the PictBridge printer 30 and the digital photo frame 1, so the operation of the PictBridge printer requires no further elaboration here.

However, it will be appreciated that since the screen 31 is not rotatable, the PictBridge printer 30 does not require an internal memory 11 adapted for storing portrait and landscape photos separately.

Figure 7:
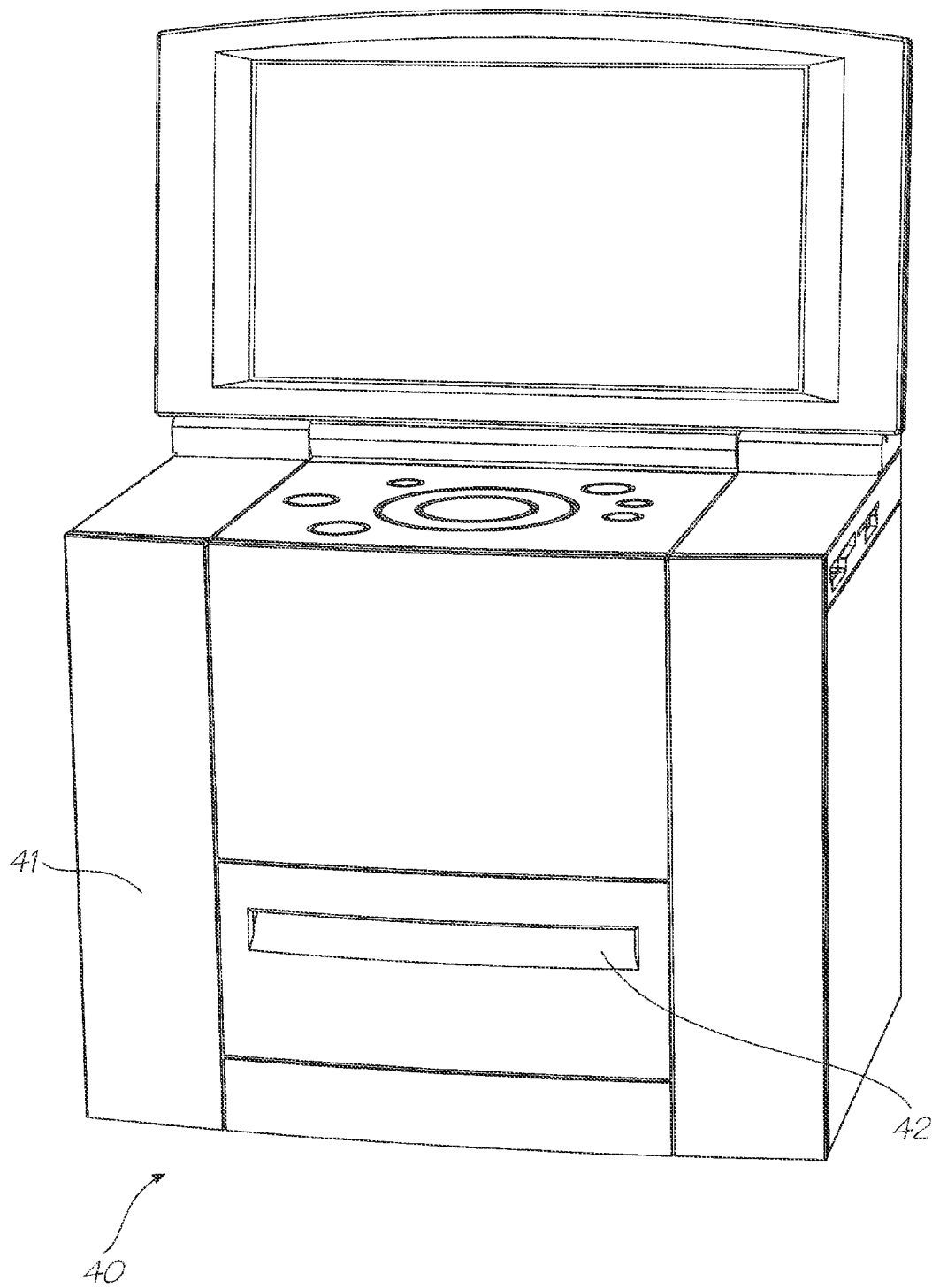
FIG. 7 is a front perspective view of an alternative PictBridge printer according to the second aspect with display screen flipped open.
Figure 8:
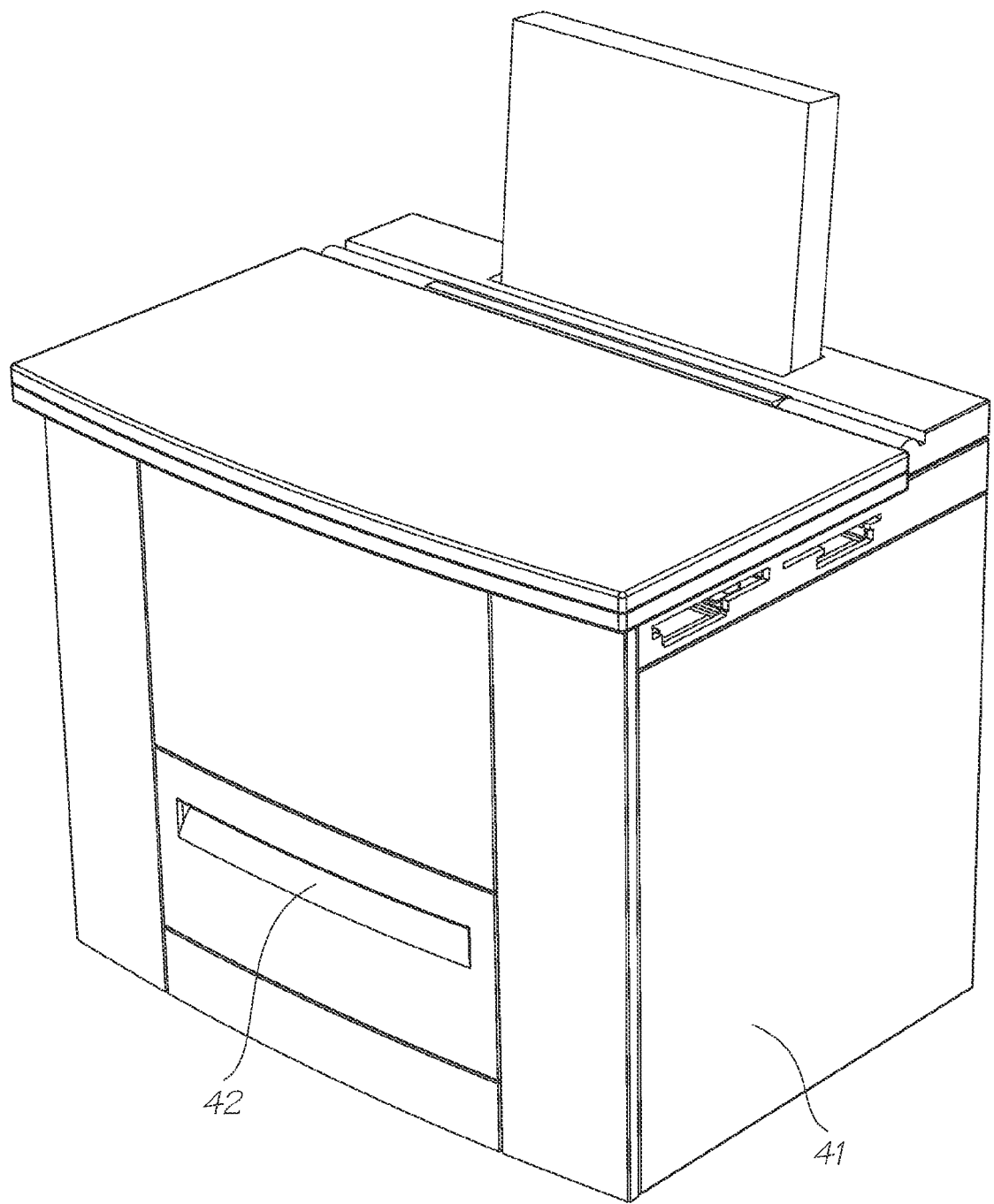
FIG. 8 is front perspective view of the PictBridge printer shown in FIG. 7 with display screen closed.

FIGS. 7 and 8 show another form of PictBridge printer 40 which is similar to the printer 30 shown in FIGS. 5 and 6. The printer 40 comprises a housing 41 having a CD reader 42 for reading a CD containing photo image files. It will be appreciated that a CD is simply another type of external memory device that communicates with the processor 10 via an appropriate interface (the CD reader 42).

The housing 41 is dimensioned to contain a relatively large supply of photo print media.

It will be appreciated that the PictBridge printers described above advantageously facilitate the displaying and printing of photos without the need for a separate PC. Moreover, since photos are viewed on a photo-sized display screen, as opposed to a digital camera screen, users are able to select more easily which photos they wish to print. For example, users can readily determine if a photo is in focus, which they cannot do when viewing an image displayed on a digital camera screen.

Methods of Printing

The digital photo frame 1 and PictBridge printers 30 and 40 described herein are suitable for supporting various methods of displaying and printing photos.

A method in which a user requests printing of photos during a slideshow in "display mode" has already been described above. This method advantageously provides an intuitive method for printing photos. The user sees the photo in a slideshow, decides if he wants to print it, and presses a print button accordingly. The method is made possible by the Applicant's high-speed inkjet printers, which can print photos on a timescale comparable to that of a photo slideshow (about 2 seconds or less per print).

Further, a method in which either portrait or landscape photos are retrieved from memory, depending on an orientation of a display screen, was also described. This method advantageously ensures that users only view photos oriented according to the orientation of the display screen of a digital photo frame. Hence, portrait-oriented photos are not displayed when the photo frame is in its landscape orientation. Likewise, landscape-oriented photos are not displayed when the photo frame is in its portrait orientation.

An alternative method of printing is also envisaged whereby a user selects a "Print All" function and every photo stored on either an external memory device (e.g. memory card, digital camera etc) or an internal memory is printed in reverse chronological order, starting with the most recently captured image. Printing continues until the user presses a "Stop" button. The method is preferably performed on a printer having a large media supply, such as the printer shown in FIGS. 8 and 9.

This method of printing advantageously provides a facile method for printing photos. It is anticipated that portable memory devices will soon be able to hold a virtually limitless number of photos. Accordingly, users will be unlikely to organize their photos into a number of different folders. Moreover, with the advent of low-cost, high-speed digital photo printing, users are more likely to be unperturbed by printing out some undesired images if it means they do not have to interact with photo file management applications on a PC. Thus, users can print out their most recent photos and simply press a stop button when they see that they have reached a point where they are printing out duplicates from a previous printing session. The convenience of this printing method will be appealing to those users who do not wish to invest time in selecting photos for printing.

Inkjet Photo Printer Technologies

The present Applicant has developed many different forms of inkjet photo printers suitable for use in the present invention. Such printers are described in some of the Applicant's copending applications listed above, the contents of which are herein incorporated by reference.

The skilled person will readily understand that digital photo frames and PictBridge printers according to the present invention may be produced by modification of the Applicant's previously disclosed inkjet photo printer technologies. For example, the essential components of the inkjet photo printer 100 described below may be incorporated into the base 6 of the digital photo frame 1. Alternatively, the inkjet photo printer 100 described below may be modified so as to incorporate a photo display 2 in an inside face of a hinged lid of the cradle unit 400.

For completeness, a representative example of one of the Applicant's inkjet photo printers will now be described. A printer 100 is provided which is intended for use as a digital photo color printer and is dimensioned to print 100 millimeter by 150 millimeter (4 inch by 6 inch) photos whilst being compact in size and light in weight. As will become apparent from the following detailed description, reconfiguration and dimensioning of the printer could be carried out so as to provide for other printing purposes.

The printer 100 of the illustrated photo printer embodiment has dimensions of 18.6 cm (W); 7.6 cm (H); 16.3 cm (D), and a weight of less than two Kilograms. The compact and light-weight design of the printer provides portability and ease of use.

The printer 100 may be easily connected to a PC via USB (such as a USB 1.1 port for USB 2.0 compatible PCs) and to digital cameras and other digital photo equipment, such as electronic photo albums and cellular telephones, via USB or PictBridge. Direct printing is available when using Pictbridge compatible digital photo equipment. This enables quick and convenient printing of digital photo images.

Connection to external power is used, preferably to mains power via a 12 Volt; 2 Amp (or 24 Volt; 1 Amp) DC power converter. However, the printer may be configured to operate from an internal power source. The printer is configured to efficiently use power, operating at a maximum power consumption of 36 Watts.

The printer 100 has three core components: a printhead cartridge 200 having a printhead and ink supply; a printer or cradle unit 400 which supports the printhead cartridge and has a media transport mechanism for transporting print media past the printhead; and a media supply cartridge 600 for supplying the media to the printer.

The present disclosure is concerned with the printhead cartridge 200, and therefore detailed description of the cradle unit and media supply cartridge is not provided herein. A full description of a suitable cradle unit and media supply cartridge for use with the printhead cartridge 200 is described in the Applicant's earlier U.S. patent application Ser. Nos. 11/293,794, 11/293,839, 11/293,839, 11/293,839, 11/293,830, 11/293,827, 11/293,828, 11/293,795, 11/293,795, 11/293,795, 11/293,795, 11/293,795, 11/293,819, 11/293,819, 11/293,819 and 11/293,819 all filed on Dec. 5, 2005 and the entire contents of which are hereby incorporated by reference.

The printhead cartridge 200 is an assembly having the necessary components for operation as a printer when mounted to the printer or cradle unit having a media supply.

Figure 9:
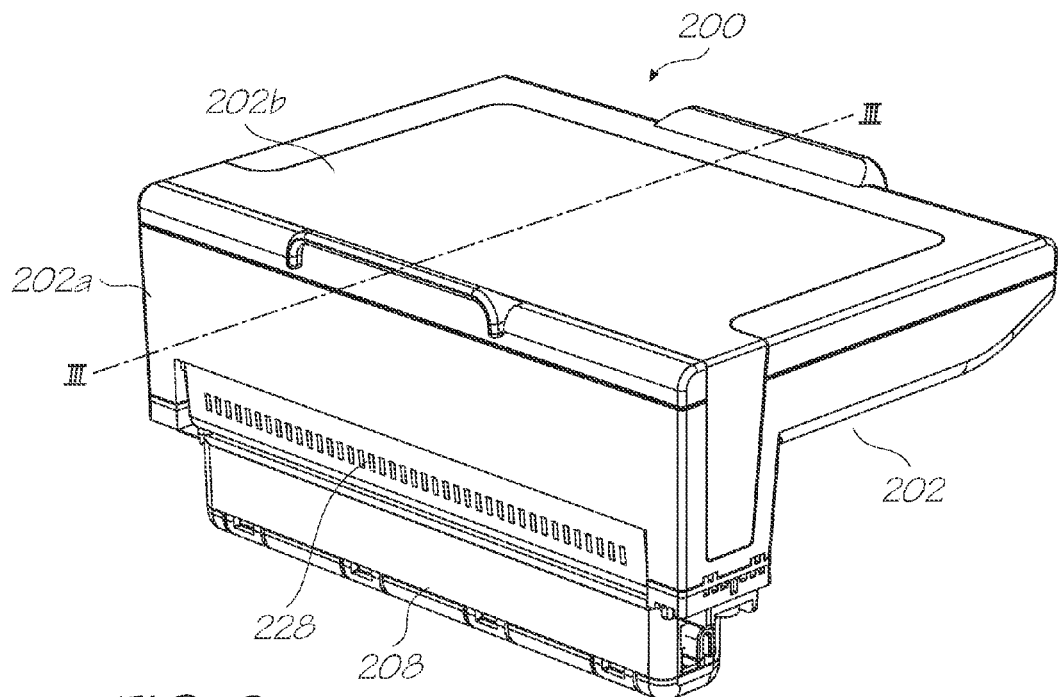
FIG. 9 shows a top elevational perspective view of a printhead cartridge of an inkjet photo printer.
Figure 10:
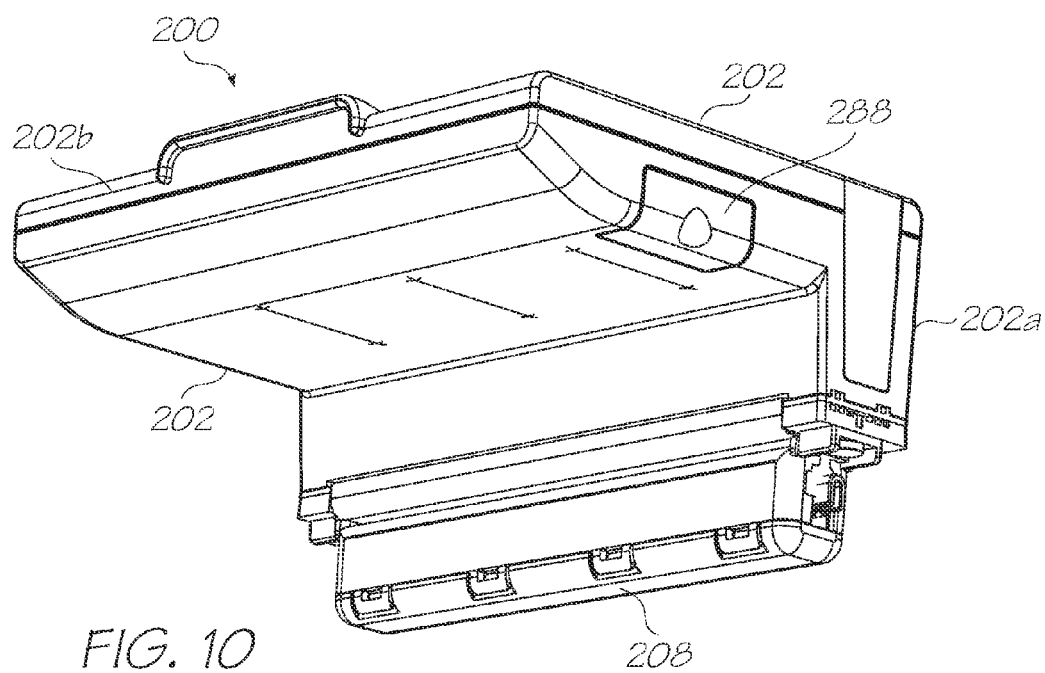
FIG. 10 shows a bottom elevational perspective view of the printhead cartridge.
Figure 11:
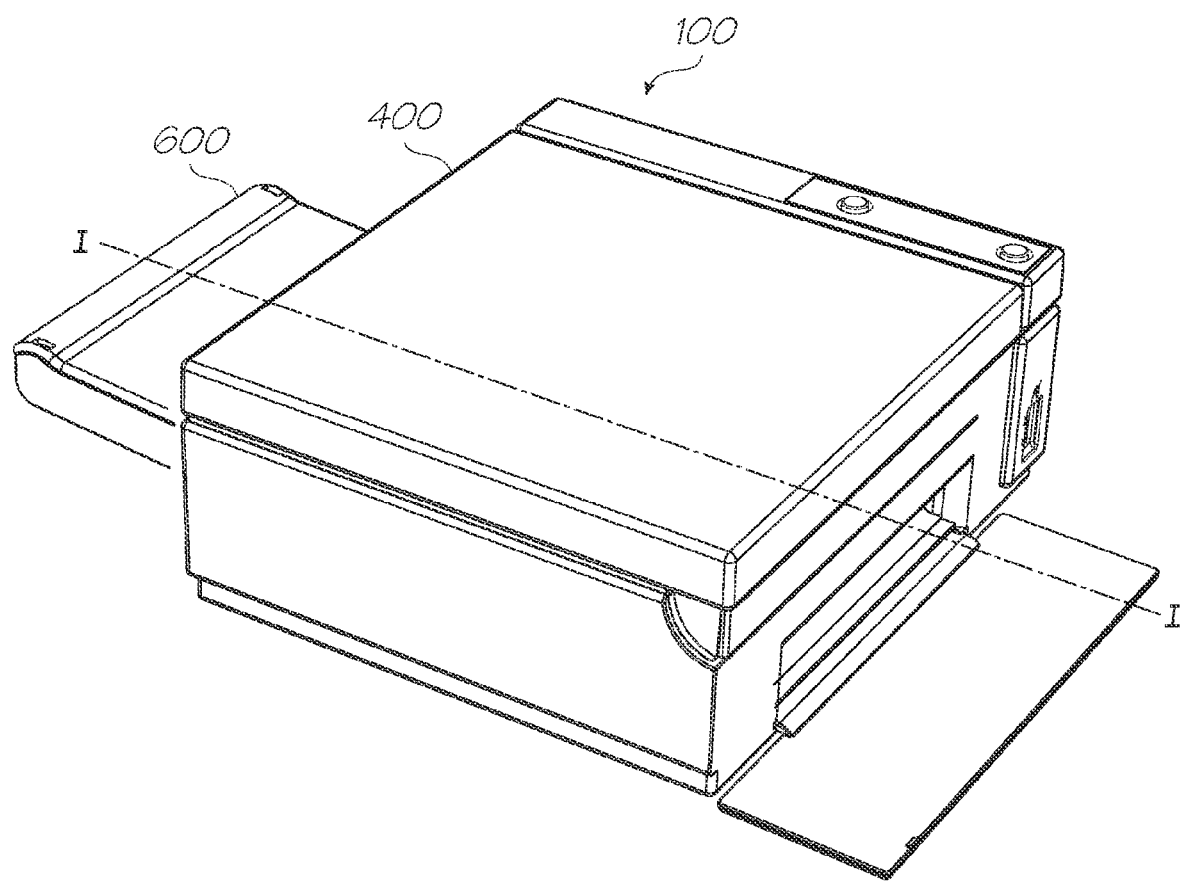
FIG. 11 shows a perspective view of the inkjet photo printer.
Figure 12:
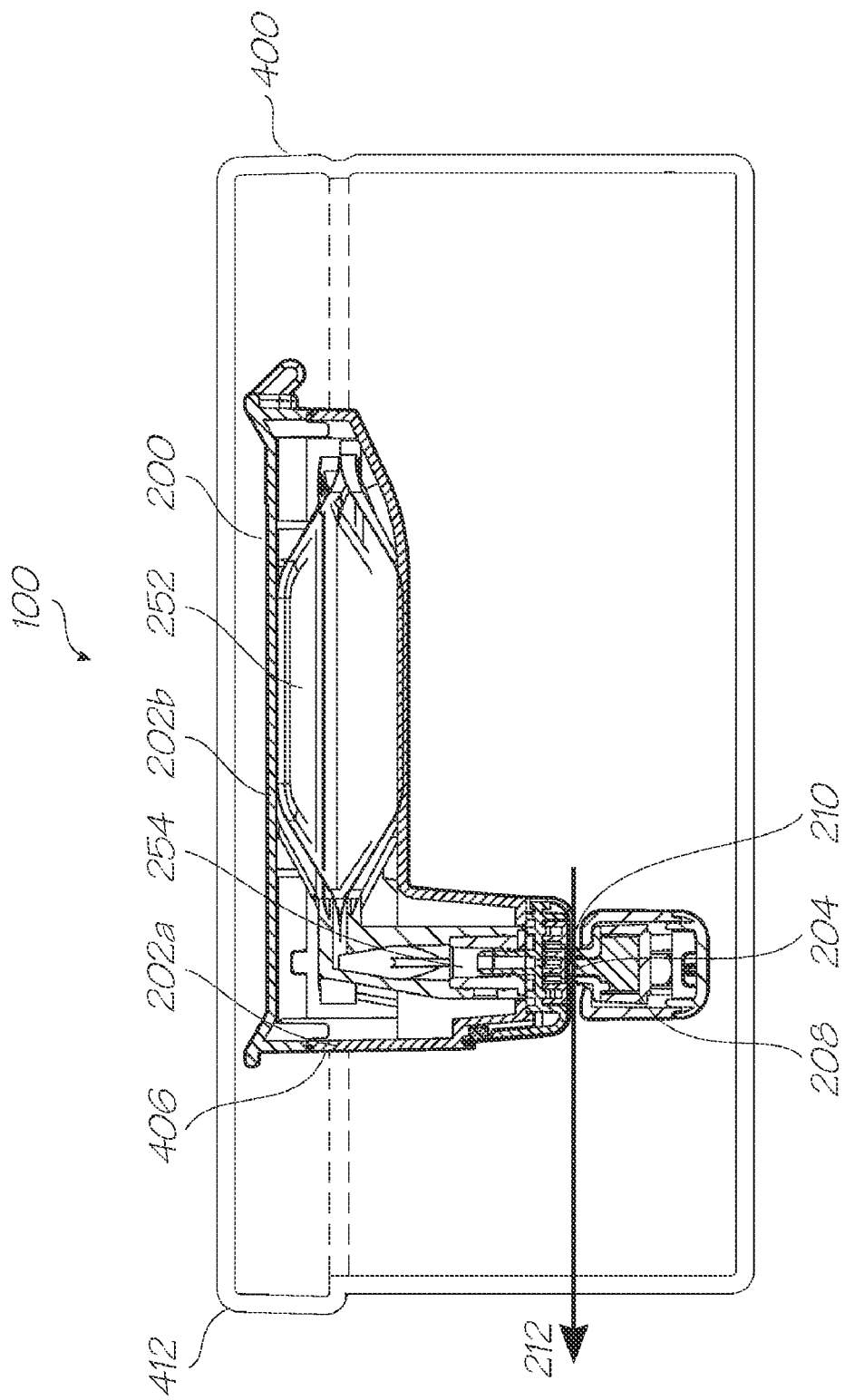
FIG. 12 shows a cross-sectional view of the inkjet photo printer taken along the line I-I of FIG. 11.
Figure 13:
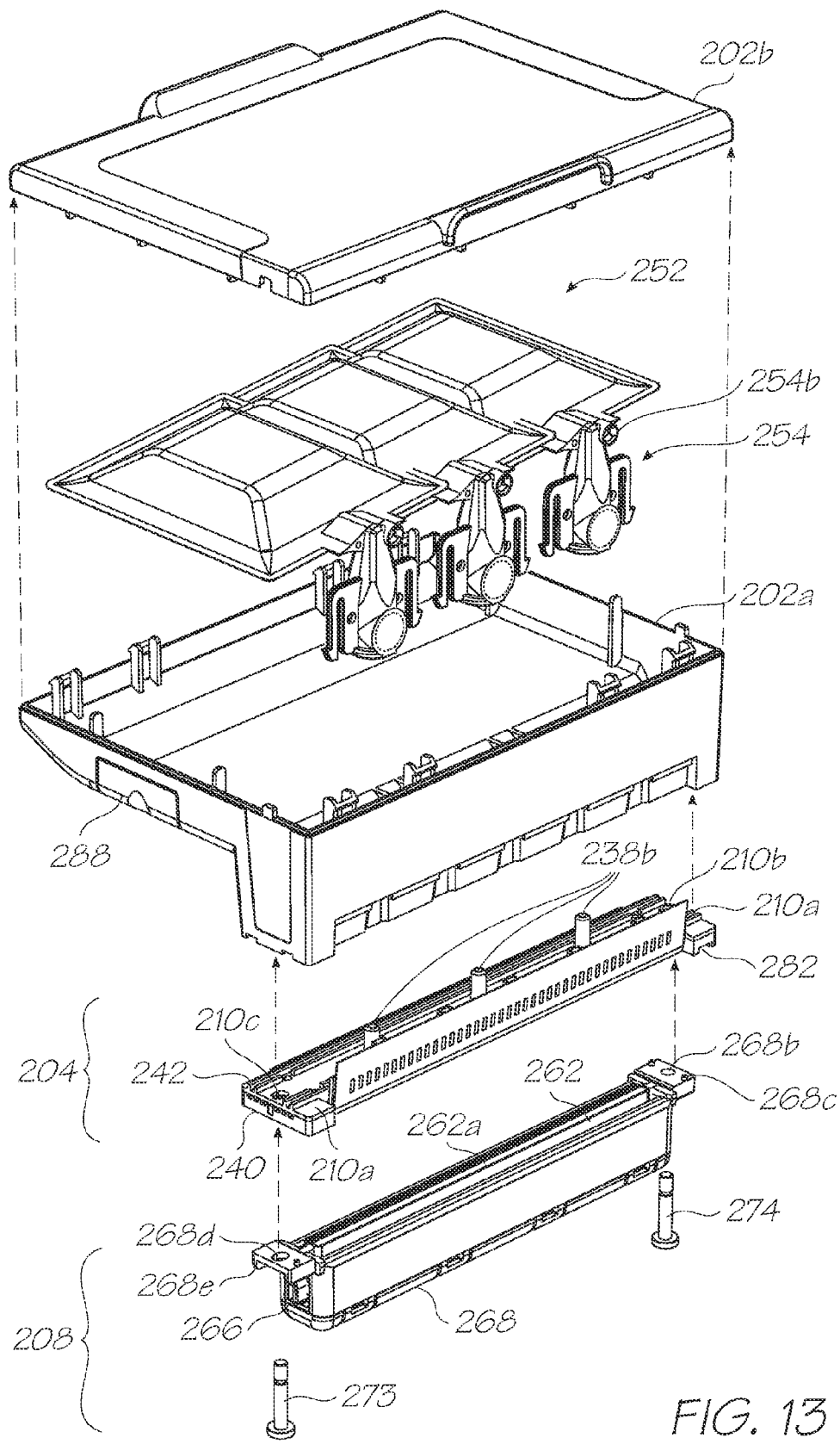
FIG. 13 shows an exploded view of the printhead cartridge.

The printhead cartridge 200 has a body 202 which is shaped to fit securely in a complementarily shaped printhead cartridge 200 support of the cradle unit (see FIGS. 9 and 12). The body 202 of printhead cartridge 200 houses a printhead 204 and an ink supply 206 for supplying ink to the printhead 204 and has a capper 208 for capping the printhead 204 when the printhead 204 is not in use.

The printhead 204 comprises an ink distribution support 210 which is used to mount the printhead 204 to the printhead cartridge body 202 and distribute ink from the ink supply 206 arranged in the body 202 to the printhead 204. The capper 208 is also mounted to the printhead cartridge body 202 via the ink distribution support 210 so as to be located beneath the mounted printhead 204 relative to the ink supply 206. A media path 212 (see arrow of FIG. 12) is formed between the printhead 204 and the capper 208 for the transport of print media past the printhead 204 when the capper 208 is not capping the printhead 204.

In the illustrated embodiment, the printhead is a pagewidth inkjet printhead. By using a pagewidth printhead it is unnecessary to scan the printhead across print media. Rather, the printhead remains stationary with the print media being transported therepast for printing. By operating the printhead to continuously print as the print media is continuously fed past the printhead (so called 'printing-on-the-fly'), the need to stall the media feed for each print line is obviated, therefore speeding up the printing performed.

The printer incorporating the printhead 204 of the printhead cartridge 200 is configured to print a full colour page in at most two seconds, which provides high-speed printing of about 30 pages per minute. This high speed printing is performed at high quality as well, with a resolution of at least 1600 dots per inch being provided by the printhead. Such a high resolution provides true photographic quality above the limit of the human visual system.

This is achieved by forming the printhead from thousands of ink ejection nozzles 214 across the pagewidth, e.g., about 100 millimeters for 4 inch by 6 inch photo paper. In the illustrated embodiment, the printhead incorporates 32,000 nozzles. The nozzles 214 are preferably formed as Memjet™ or microelectomechanical inkjet nozzles developed by the Applicant. Suitable versions of the Memjet™ nozzles are the subject of a number of the applicant's patent and pending patent applications, the contents of which is incorporated herein by cross reference and the details of which are provided in the cross reference table above.

Brief detail of a printhead suitable for use in the printhead cartridge 200 is now provided. The printhead is formed as a 'linking printhead' 216 which comprises a series of individual printhead integrated circuits (ICs) 218. A full description of the linking printhead, its control and the distribution of ink thereto is provided in the Applicant's co-pending U.S. application Ser. Nos. 11/014,769, 11/014,729, 11/014,743, 11/014,733, 11/014,754, 11/014,755, 11/014,765, 11/014,766, 11/014,740, 11/014,720, 11/014,753, 11/014,752, 11/014,744, 11/014,741, 11/014,768, 11/014,767, 11/014,718, 11/014,717, 11/014,716, 11/014,732 and 11/014,742, all filed Dec. 20, 2004 and U.S. application Ser. Nos. 11/097,268, 11/097,185, 11/097,184, all filed Apr. 4, 2005 and the entire contents of which are incorporated herein by reference. In the illustrated embodiment, the linking printhead 216 has five printhead ICs 218 arranged in series to create a printing zone 219 of a 100.9 millimeter pagewidth.

Figure 15:
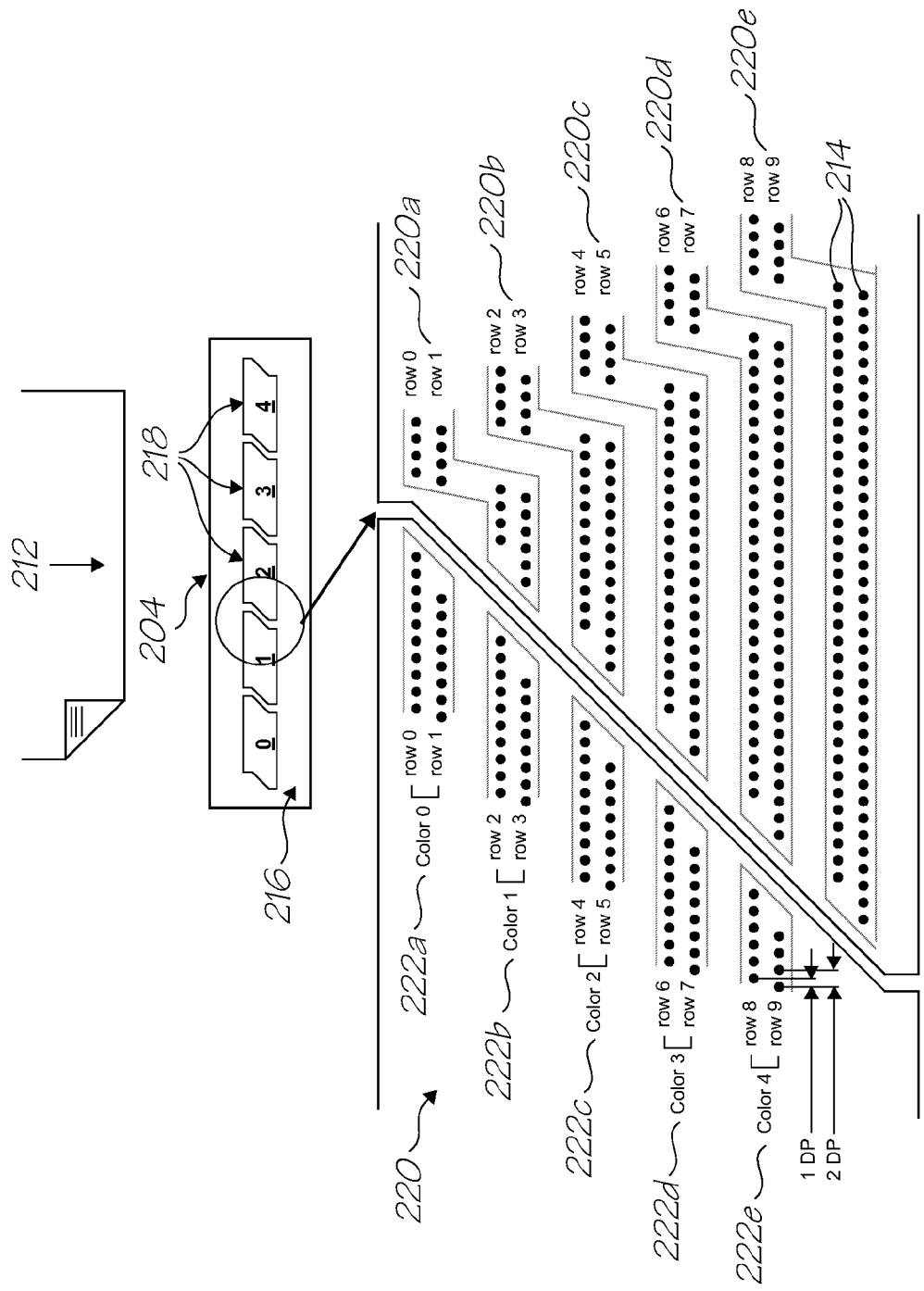
FIG. 15 illustrates an arrangement of printhead integrated circuits of the printhead.

Each printhead IC incorporates a plurality of nozzles 214 positioned in rows 220 (see FIG. 15). The nozzle rows 220 correspond to associated ink colours to be ejected by the nozzles 214 in that row 220. The illustrated embodiment has ten such rows 220 arranged in groups of two adjacent rows 220a-e for five colour channels 222a-e. However, other arrangements may be used. In the illustrated arrangement, each printhead IC has 640 nozzle per row, 1280 nozzles per colour channel, 6400 nozzles per IC and therefore 32000 nozzles for the five ICs of the printhead. Of course, a different number of printhead ICs, including less or more than five printhead ICs may be used.

Figure 16:
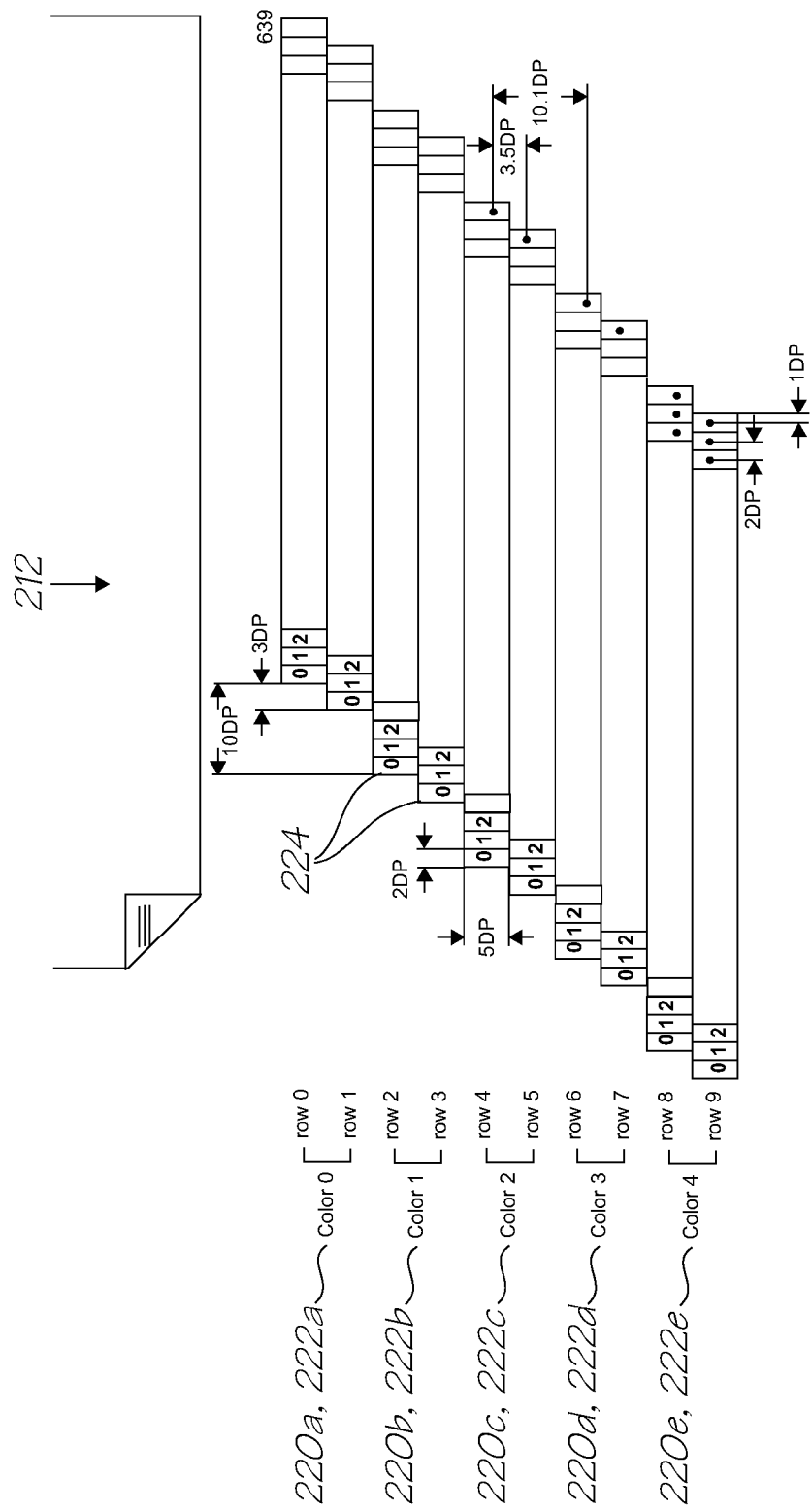
FIG. 16 illustrates an arrangement of ink ejection nozzles of the printhead integrated circuits.

The nozzles 214 are arranged in terms of unit cells 224 containing one nozzle 214 and its associated wafer space. In order to provide the print resolution of 1600 dots per inch, an ink dot pitch (DP) of 15.875 microns is required. By setting each unit cell to have dimensions of twice the dot pitch wide by five times the dot pitch high and arranging the unit cells 224 in a staggered fashion as illustrated in FIG. 16, this print resolution is achieved.

Figure 17:
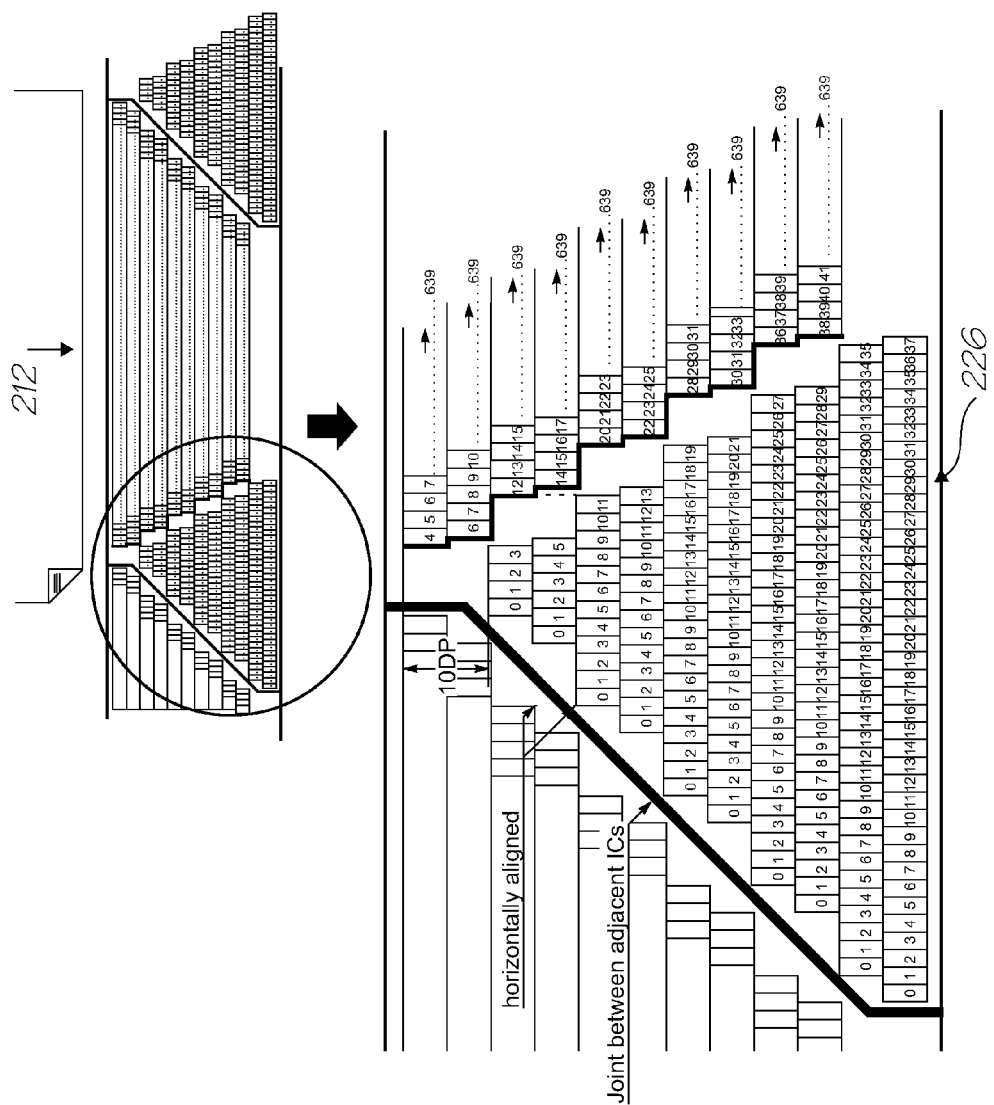
FIG. 17 illustrates a nozzle triangle of the printhead.

Due to this necessary staggered arrangement of the nozzles 214 discontinuity is created at the interface between the adjacent printhead ICs 218. Such discontinuity will result in discontinuity in the printed product causing a reduction in print quality. Compensation of this discontinuity is provided by arranging a triangle 226 of nozzle unit cells 224 displaced by 10 dot pitches at the interface of each adjacent pair of printhead ICs 218 (see FIG. 17).

The nozzle triangles 226 allow the adjoining printhead ICs 218 to be overlapped which allows continuous horizontal spacing between dots across the multiple printhead ICs 218 along the printhead and therefore compensates for any discontinuity. The vertical offset of the nozzle triangle 226 is accounted for by delaying the data for the nozzles 214 in the nozzle triangle 226 by 10 row times. The serially arranged nozzles rows 220 and nozzle triangles 226 of the printhead ICs 218 together make up the printing zone 219 of the printhead.

The transfer of data and power to the printhead nozzles is controlled by print control circuitry of the cradle unit when the printhead cartridge 200 is inserted therein. Connection of power and data is made to the printhead 204 via engagement and electrical connection of a connection interface of the cradle unit and a connection panel 228 of the printhead cartridge 200 (see FIGS. 9 and 12).

Figure 14:
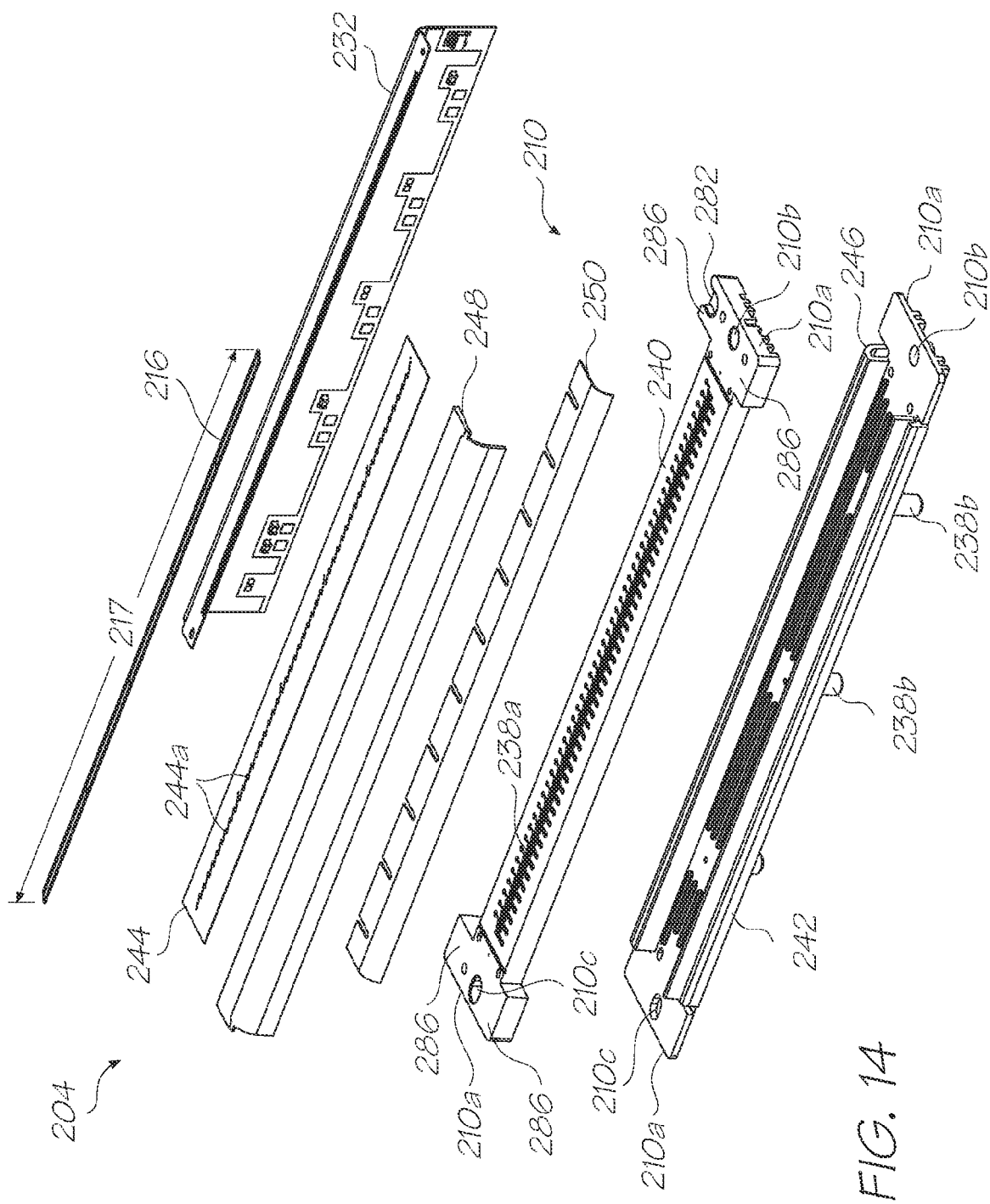
FIG. 14 shows an isolated view of a printhead of the printhead cartridge.
Figure 18:
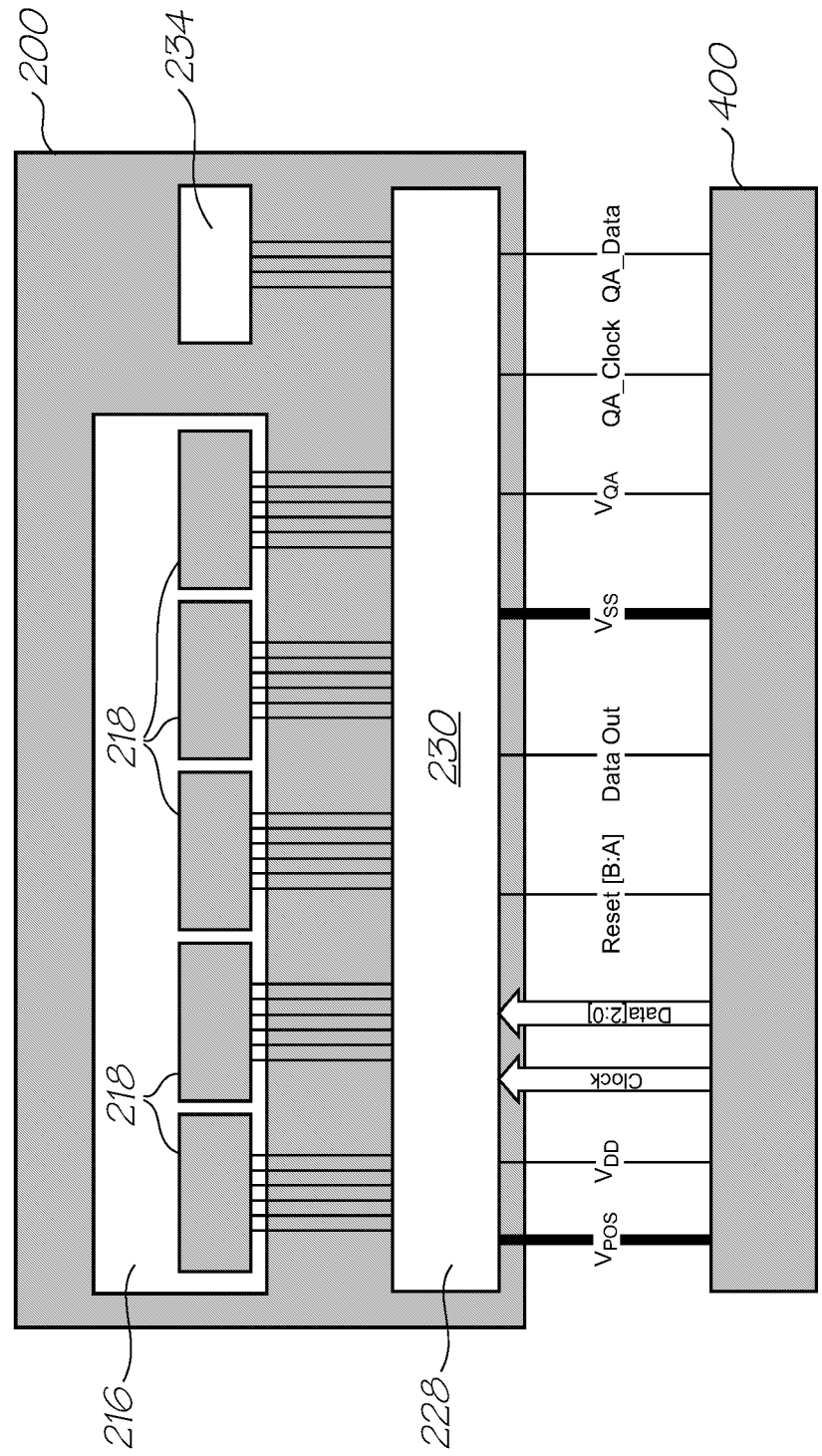
FIG. 18 illustrates data and power connections between the printhead cartridge and a cradle unit of the inkjet photo printer.

The connection panel 228 comprises a plurality of electrical contacts 230 positioned on a flexible printed circuit board 232. The flexible printed circuit board 232 is mounted to the ink distribution support 210 so as to wrap around one longitudinal edge thereof to expose the electrical contacts 230 to the connection interface of the cradle unit and to connect the contacts to the nozzles of the printhead 204 (see FIGS. 14 and 21). The specific connections made between the printer/cradle unit and the printhead 204 are illustrated in FIG. 18. In the illustrated embodiment, 40 contacts are provided in the connection panel at a pitch of 2.54 millimeters. The power ($V_{POS}$) and data delivered via these contacts is bussed to pins of the printhead ICs 218 and a quality assurance (QA) chip 234 of the printhead cartridge 200. The QA chip 234 is provided for ink quality assurance and defines technical compatibility between the printhead cartridge 200 and printer/cradle unit.

The QA chip 234 is configured to track usage of the nozzles, the number of prints that have been performed by the printhead cartridge 200 and the amount of ink remaining in the ink supply 206. This information is used to ensure that the printhead cartridge 200 is only used by a predetermined usage model. Such a usage model limits the use-lifetime of the printhead cartridge 200 in order to maintain consistent print quality.

For example, the model may either be a page-limited model which sets the number of pages which can be printed using the printhead cartridge 200 (e.g., 200 photo pages) or an ink-limited model which sets a maximum number of pages that can be printed without depleting the ink of the (non-refillable) ink supply 206. In this way, the printhead cartridge 200 is caused to be operational within the operational lifetime of the printhead nozzles 214 and within the supply of ink for full colour printing. Other suitable models for ensuring consistent print quality may also be used.

The QA chip 234 may also be configured to store additional information related to the manufacture of the printhead cartridge 200, including manufacture date, batch number, serial number, manufacturing test results (e.g., a dead nozzle map), etc.

The print control circuitry of the cradle unit interrogates the QA chip 234 via the connection interface and connection panel to read all available information, and uses the results to control the operation of the printer.

In controlling the printhead, the print control circuitry controls the supply of firing power to the nozzles in order to control the ejection of ink onto the passing print media. Each nozzle is configured to eject an ink drop having a volume of about 1.2 picoliters and a velocity of about eight meters per second. In order to consistently eject drops having these parameters, the power routed to the printhead by the cradle unit is regulated at the connection interface. The regulated power is restricted to have variations of less than 100 milli-Volts in the 5.5 Volts; 3.5 Amp supplied to the printhead from the 12 Volt; 2 Amp power supply. Variations of this order have negligible effect on drop ejection and therefore the firing pulse width supplied by the print control circuitry can be constant.

Firing of the nozzles may also cause brief peaks in the current consumption. These peaks are accommodated by the inclusion of energy storage circuitry in the connection interface of the cradle unit. Further energy storage can also be provided on the printhead 204 in the form of decoupling capacitors 236 on the flexible printed circuit board 232 (see FIGS. 19 and 21).

Figure 19:
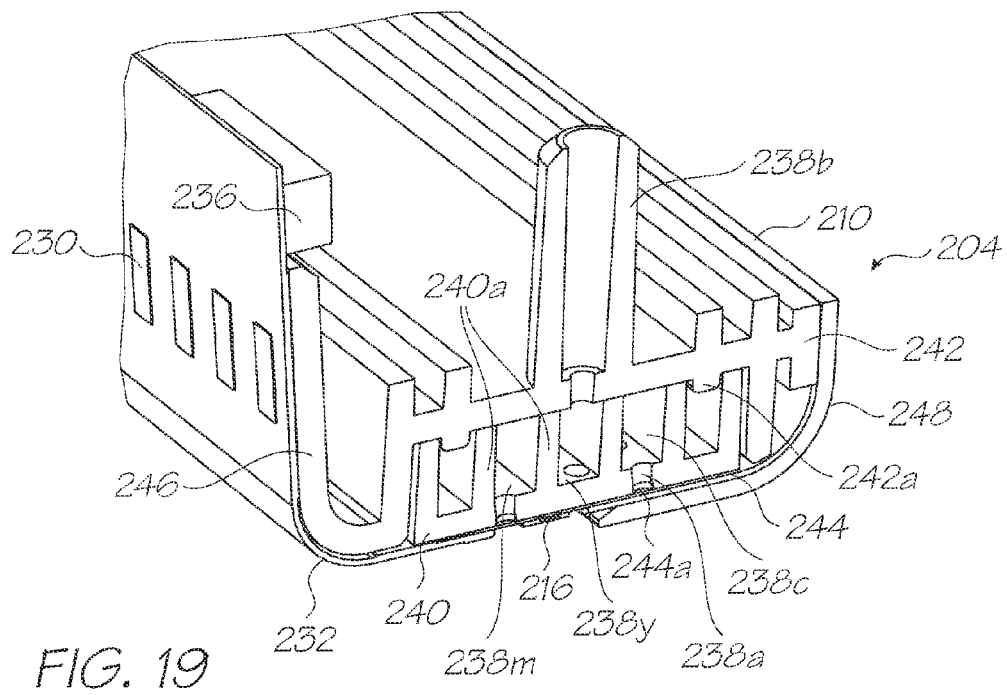
FIG. 19 shows a top elevational, partial cross-sectional view of the printhead taken about line II-II of FIG. 14.
Figure 20:
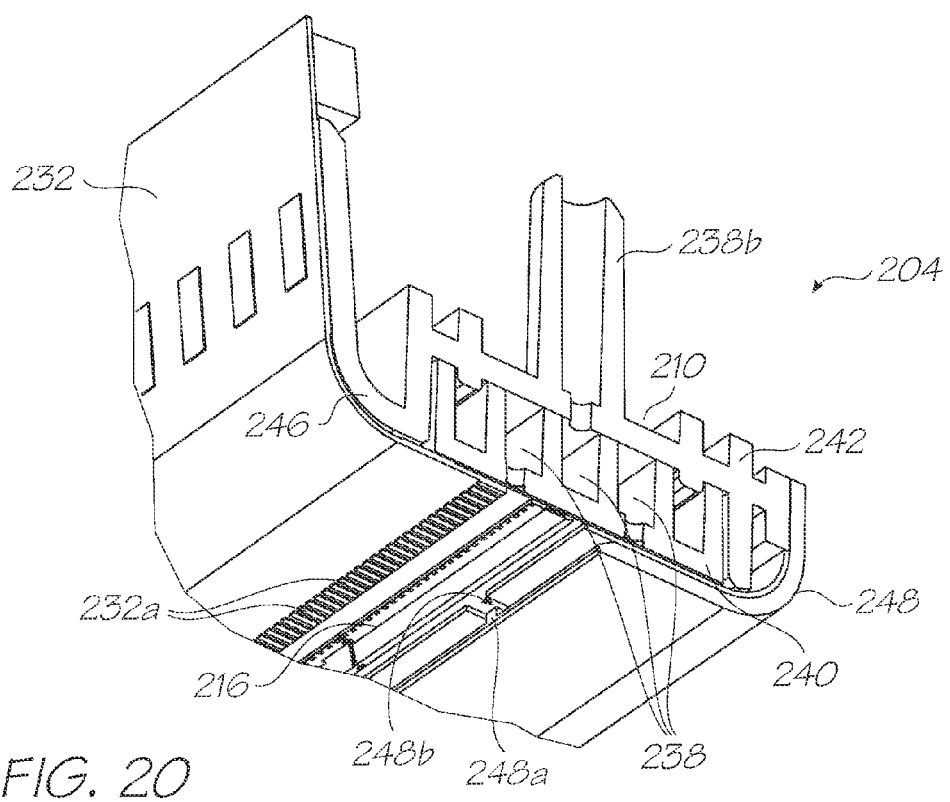
FIG. 20 shows a bottom elevational, partial cross-sectional view of the printhead taken about line II-II of FIG. 14.
Figure 21:
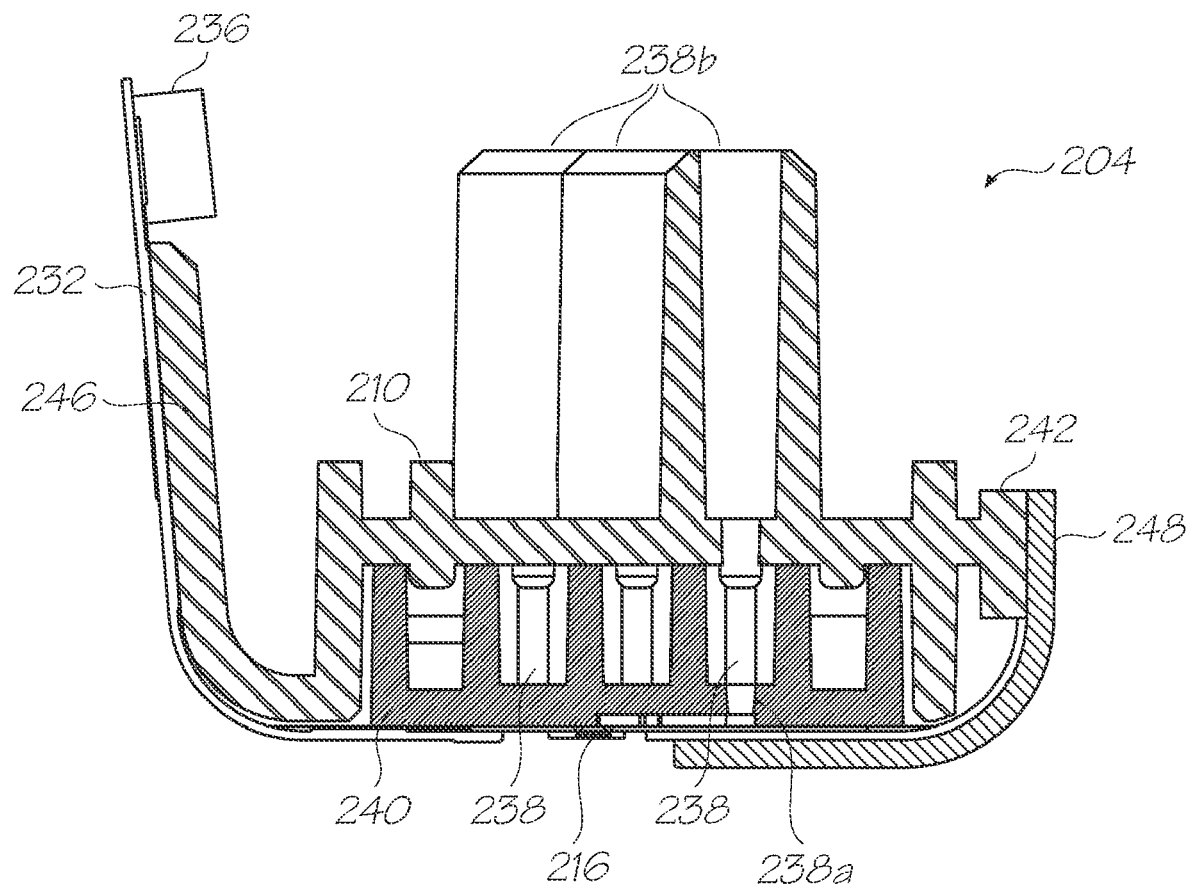
FIG. 21 shows a side cross-sectional view of the printhead taken about line II-II of FIG. 14.

As discussed earlier, five colour channels 222a-e are provided in the printhead 204. In the illustrated embodiment, the channels comprise two magenta ink channels, two cyan ink channels and one yellow ink channel. In order to distribute ink from the supply of the magenta, cyan and yellow inks to the nozzle rows, the ink distribution support 210 has three ink paths 238 as illustrated in FIGS. 19 to 21. The three ink paths 238 include a magenta ink path 238m, a cyan ink path 238c and a yellow ink path 238y.

The ink paths 238 are formed by the cooperation of an upper portion 240 and a lower portion 242 of the ink distribution support 210. The upper and lower portion 240,242 are preferably molded portions having details 240a,242a for forming the ink paths 238. Preferably, the upper and lower portion are molded from liquid crystal polymer, which is inert to the ink and can be configured to have thermal expansion characteristics similar to those of silicon which is used in the printhead ICs 218. The upper and lower portion 240,242 are bonded to one another to provide a seal for the ink paths 238.

The printhead 204 is an assembly of the ink distribution support 210 and the linking printhead 216 in which the linking printhead 216 is adhesively mounted to the ink distribution support 210 by a polymer sealing film 244. The sealing film 244 has a plurality of through-holes 244a which correspond to, and align, with conduits 238a from each of the ink paths 238 to the underside of the lower portion 242 of the ink distribution support 210 and associated ink delivery inlets in the underside of each printhead IC of the linking printhead 216. The sealing film 244 provides an effective seal between the ink path 238a and the printhead ink delivery inlets to prevent the wicking and mixing of ink between the different nozzle rows and individual nozzles. It is noted that the magenta and cyan ink paths 238m and 238c each have conduits 238a for feeding ink to two of the five colour channels of the linking printhead 216.

The flexible printed circuit board 232 is mounted to a flange 246 of the upper portion 240 of the ink distribution support 210 so that contact pads 232a of the flexible printed circuit board 232 are able to communicate data and power signals to each of the printhead ICs 218 via pads provided along one edge of the printhead ICs 218 (see FIGS. 20 and 21).

A media shield 248 is also mounted to the ink distribution support 210 along the opposite edge of the linking printhead 216 to the flexible printed circuit board 232. In the illustrated embodiment, the media shield 248 is mounted via an adhesive film 250, however other arrangements are possible. The media shield 248 is configured to maintain the passing media at a predetermined distance from the nozzles 214 of the linking printhead 216. This prevents damage being caused to the nozzles by contact of the media with the nozzles. The media shield 248 is preferably a molding formed of liquid crystal polymer. As can be seen from FIG. 20, the media shield 248 is spaced from the surface of the ink distribution support 210 by details 248a. A space 248b provided by the details 248a provides the predetermined distance of the print media from the nozzles 214.

Figure 22:
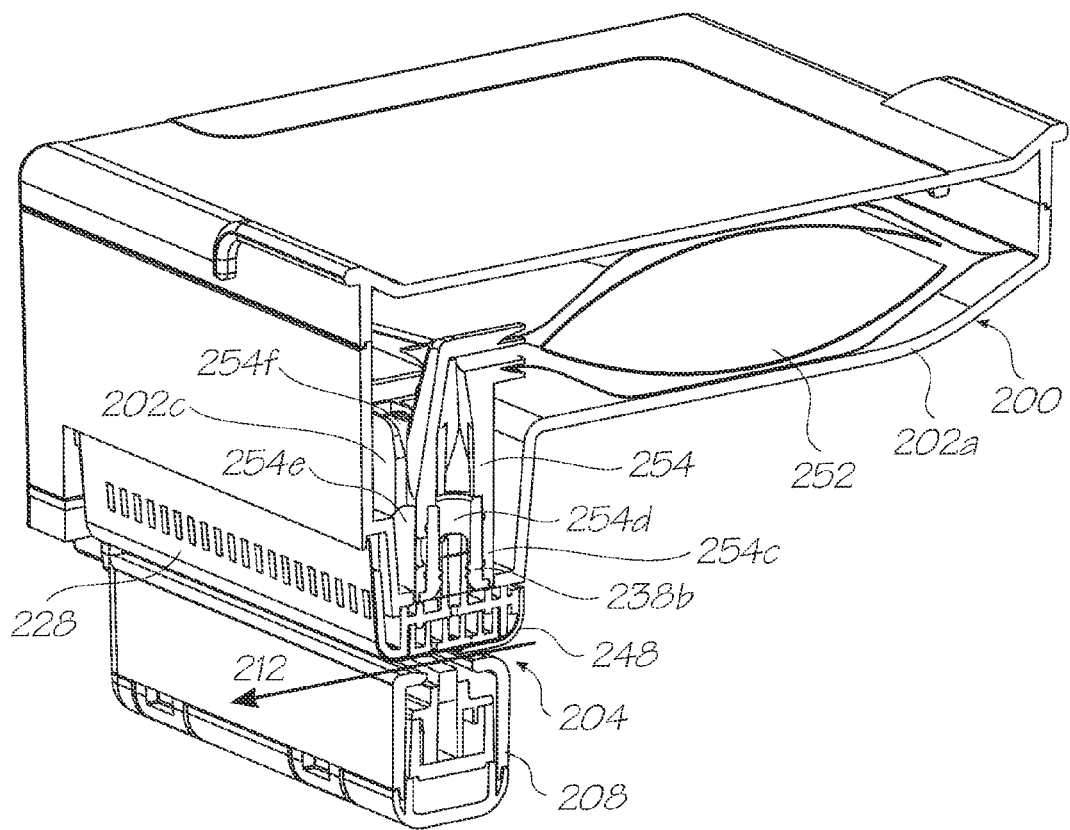
FIG. 22 shows a partial side cross-sectional view of the printhead cartridge taken about line III-III of FIG. 9.

In the illustrated embodiment, the ink paths 238 of the ink distribution support 210 each have a conical or cylindrical inlet member 238b for fluid connection to an associated ink bag 252 of the ink supply 206 (see FIG. 22). Three ink bags 252 are provided, a magenta ink bag, a cyan ink bag and a yellow ink bag. The ink bags 252 are positioned in a base 202a of the body 202 of the printhead cartridge 200 which is enclosed by a lid 202b. The base and lid of the body are preferably plastics moldings having clip details for snap fitting the lid to the base.

Figure 23:
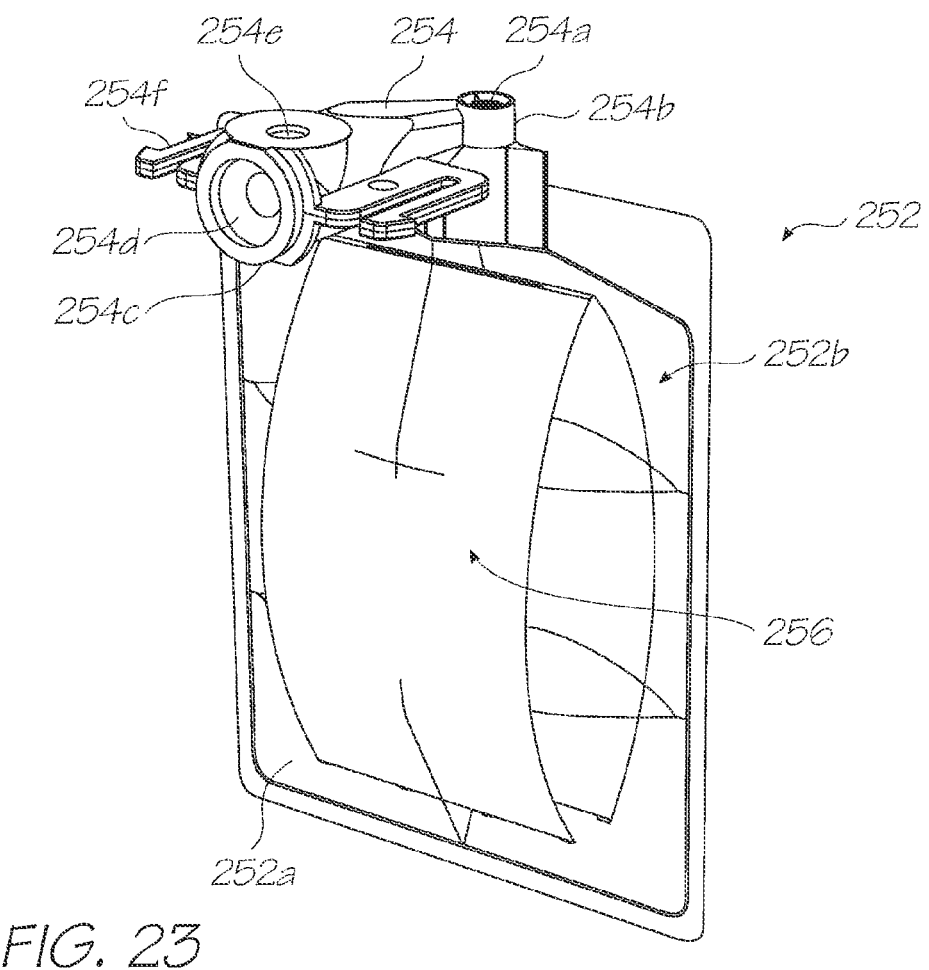
FIG. 23 shows an isolated view of an ink supply bag of the printhead cartridge.

One of the ink bags 252 is illustrated in FIG. 23. The ink bag is formed of two profiled panels 252a which are sealed together to make an ink holding chamber 252b. The ink holding chamber 252b of each ink bag is dimensioned to hold an ink volume of at least 19 milliliters up to about 23 milliliters and is configured to be collapsible so as to reduce the available ink volume. The sealed panels 252a seal about a connector assembly 254 and a folded leaf spring 256. The connector assembly 254 is used for both filling of the ink bag with the required ink volume during manufacture of the printhead cartridge 200 and connecting the ink bag 252 with the inlet member 238b of the respective ink path 238 of the ink distribution support 210.

Distribution of ink from the ink bag 252 to the ink paths 238 via the connector assembly 254 is performed through an outlet 254c of the connector assembly 254. The cylindrical outlet 254c is fitted with a coupling seal 254d which has ring details on the exterior cylindrical surface for preventing ink from leaking between the outlet's inner surface and the coupling seal, and ring details on the interior cylindrical surface for preventing ink from leaking between the coupling seal and the outer surface of the inlet member of the ink path (see FIG. 22).

Filling of the ink bag and priming of ink into the connector assembly 254 is performed by injecting ink into an access hole 254e of the connector assembly 254. Air within the ink bag/connector assembly is able to escape through an outlet 254b during filling. Once filled, a ball seal 254a seals the outlet 254b and the coupling seal 254d, which is provided with a cover seal (not shown), is positioned in the outlet 254c to seal off the access hole, as illustrated in FIG. 22. Air is undesired within the ink bag and connector assembly 254 so as to prevent air from entering the ink distribution support 210 and the nozzles 214. Air or other gases may cause printing problems due to the microscopic size of the nozzles. A suitable air filter (not shown) may also be incorporated within the connector assembly 254 to exclude any air present in the ink bag from entering the ink distribution system.

The connector assembly 254 is mounted within the interior of the cartridge body base 202a by engaging clips 254f of the connector assembly 254 with details 202c in the base 202a which sealingly engages the outlets of the connector assemblies with the inlet members 238b of the respective ink paths 238 (see FIG. 22).

Figure 25:
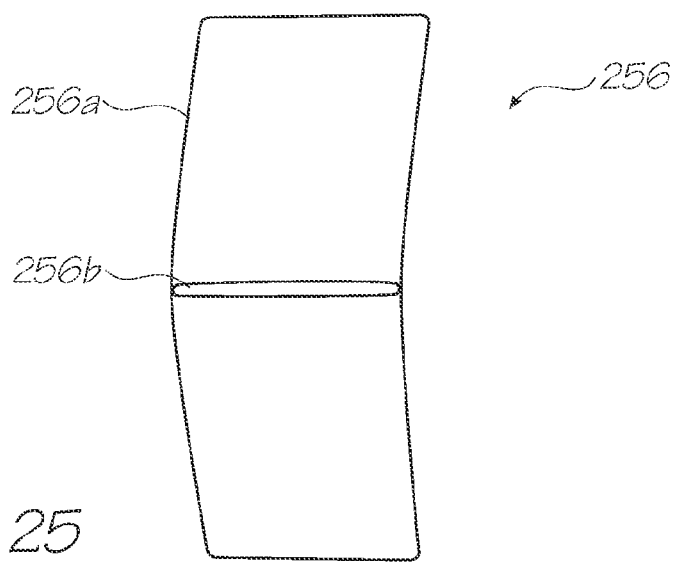
FIG. 25 illustrates the leaf spring unfolded.
Figure 24:
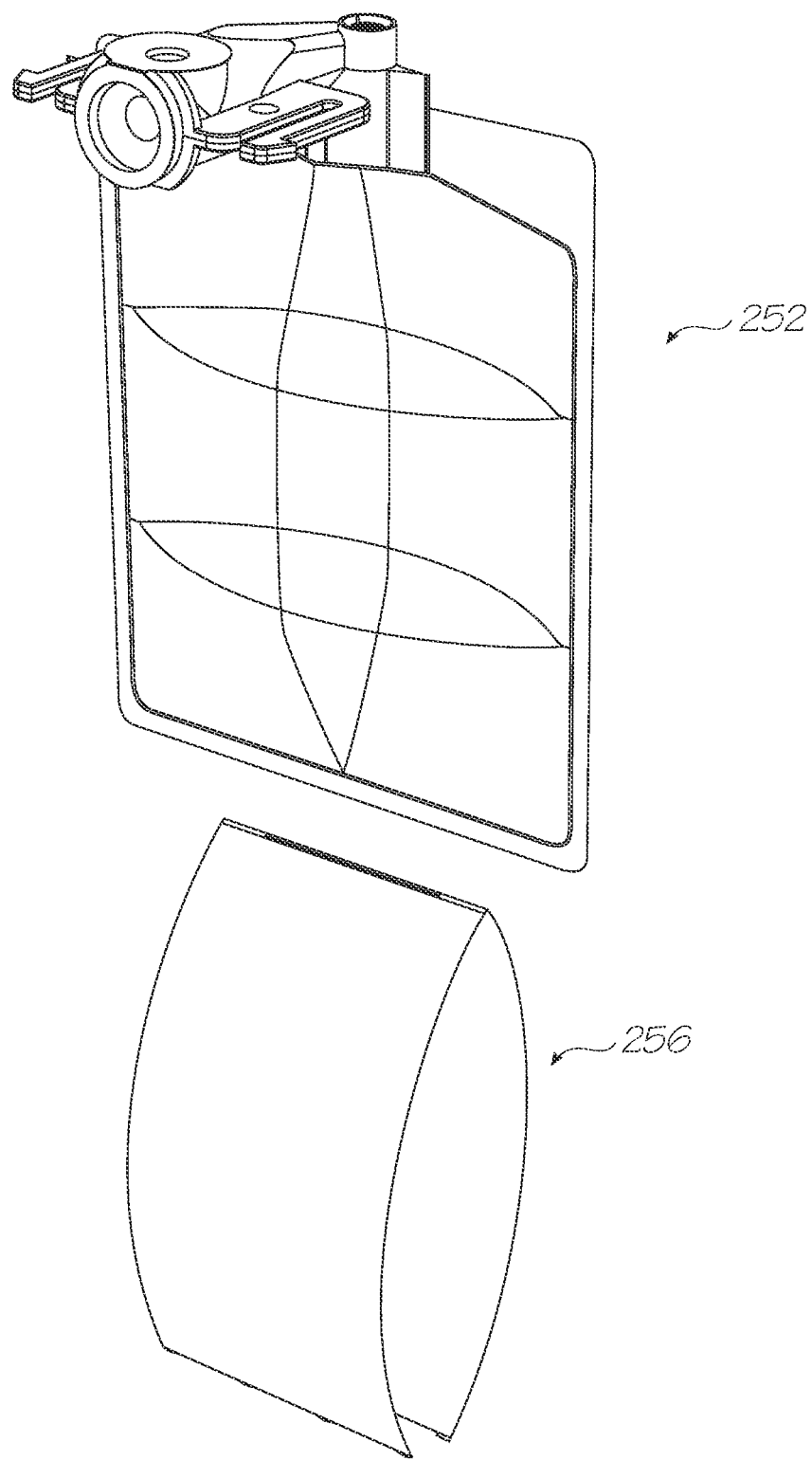
FIG. 24 illustrates a folded leaf spring as removed from the ink bag.

The folded leaf spring 256 of each bag 252 is formed by folding an elongate plate 256a about a centrally disposed slot 256b (see FIGS. 24 and 25). The elongate plate 256a is dimensioned so that when folded it fits within the sealed ink bag 252. The elongate plate 256a is formed so as to be resilient to the folding and the folding is performed so as to create a curvature in the folded plate. This creates a folded leaf spring which is resistant to an inwardly directed force and which in turn applies an outwardly directed force. A leaf spring having a spring constant equivalent to 1.2 Newtons across an eight millimeter distance between the faces is suitable. Mylar is a suitable material for the leaf spring for its shape memory characteristics. When Mylar is used the folded leaf spring may be thermally formed. Other spring materials may be used, such as stainless steel.

The use of the leaf springs 256 within the ink bags 252 provides negative fluid pressure at the nozzles of the printhead 204 when the ink bags 252 are connected to the nozzles and the ink has been fully primed to the nozzles from the ink bags 252. Negative fluid pressure is created by the leaf spring exerting outwardly directed force on the interior walls of the ink bag panels 252a. Negative fluid pressure is desired at the nozzles to ensure that uncontrolled ejection or leakage of ink from the nozzles does not occur.

A negative pressure head of about −100 millimeters is required to effectively prevent ink from leaking at the nozzles. The illustrated leaf springs 256 may cause fluctuations in the negative pressure head as ink is depleted from the ink bags 252 and therefore the ink volume decreases.

In an alternative embodiment, coil springs or like compression springs 258 may be used in place of the leaf springs 256. The use of a suitably configured compression spring 258 within the ink bag 252, and attachment of the ink bag 252 to the underside of the lid 202b of the cartridge body 202 with suitable adhesive, ensures that a constant negative pressure head is created at the nozzles independent of the ink volume in the ink bags 252. A suitably configured compression spring, for an ink bag of area 30 millimeters by 50 millimeters, is a spring having the required free length and a spring constant of 14.7 Newtons per meter.

Figure 26:
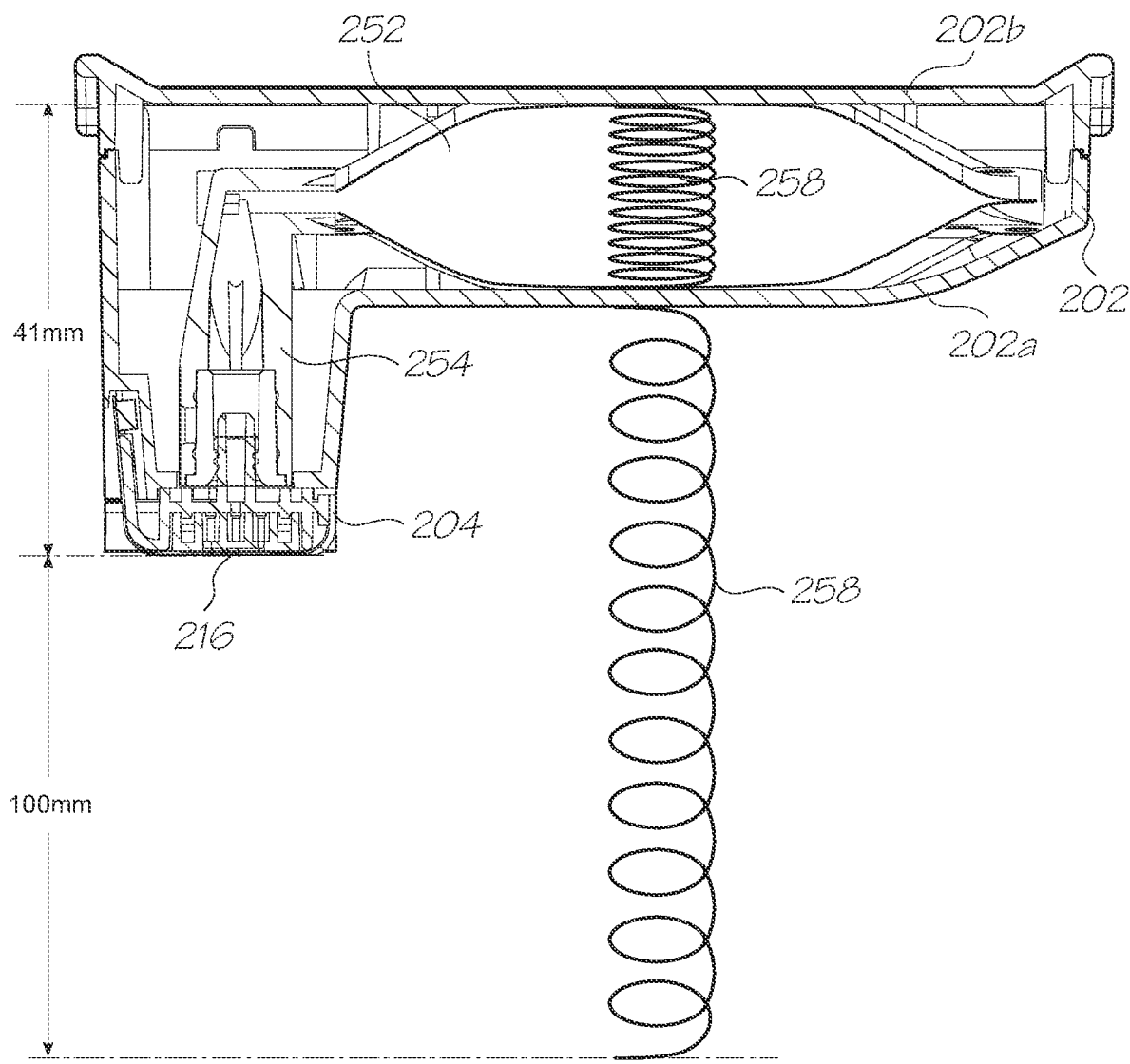
FIG. 26 illustrates an alternative biasing arrangement of the ink bag.

The required free length is a combination of a free length of 100 millimeters and the height of the printhead cartridge 200 (e.g., from the attached point of the top of the ink bag 252 to the ink ejection plane of the nozzles). In the illustrated embodiment, the printhead cartridge 200 has a height of 41 millimeters from the interior of the lid 202b to the nozzles of the printhead 204, resulting in a free length of 141 millimeters for the compression spring 258 (see FIG. 26).

In the present embodiment, the leaf springs 256 also facilitate the priming of ink from the ink bags 252 to the connected nozzles. Priming is performed before packaging of the printhead cartridge 200 for distribution, and ensures that ink is situated throughout the operational system thereby removing any air or particulate matter in the system prior to printing. In order to prime ink into each of the ink paths 238 of the ink distribution support 210 and nozzles 214, the ink bags 252 are effectively overfilled with ink. That is, the printing volume of ink within each ink bag is set to be less than a 19 milliliter volume. A priming volume of about four milliliters is needed from each ink bag for priming the system. Thus, a printing volume of at least 15 milliliters is provided in each ink bag.

In practice, an additional volume of up to four milliliters is made available in each ink bag in order to account for the inability of the ink bags to be completely collapsed due to the non-zero width of the fully folded (i.e., compressed) leaf spring.

Figure 27A:
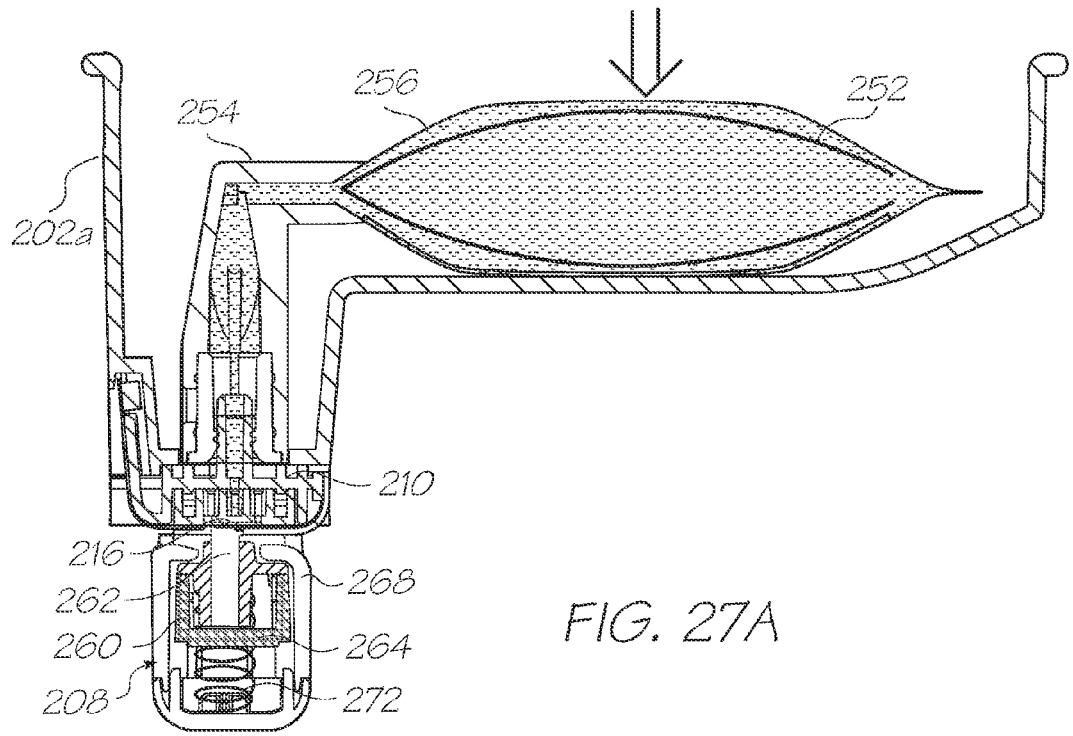
FIGS. 27A and 27B illustrate priming of ink into the printhead and a capping position of a capper of the printhead cartridge.

In order to prime the priming volume into the ink paths and nozzles, force is applied with a suitable force applicator to the exterior surface of one or both panels 252a of the ink bags 252, as shown by the arrow in FIG. 27A. In order to provide effective priming, the folded leaf springs 256 are configured to contact the interior surfaces of the ink bags 252 only once the printing volume has been reached in the ink bag. That is, the leaf springs 256 effectively float within the overfilled ink bags 252 prior to priming being performed. The force applicator is arranged to apply the inwardly directed priming force until the resistance caused by the outwardly directed force of the leaf spring is encountered, as shown by the arrows in FIG. 27B. In this way, negative pressure is immediately created at the primed nozzles.

Figure 27B:
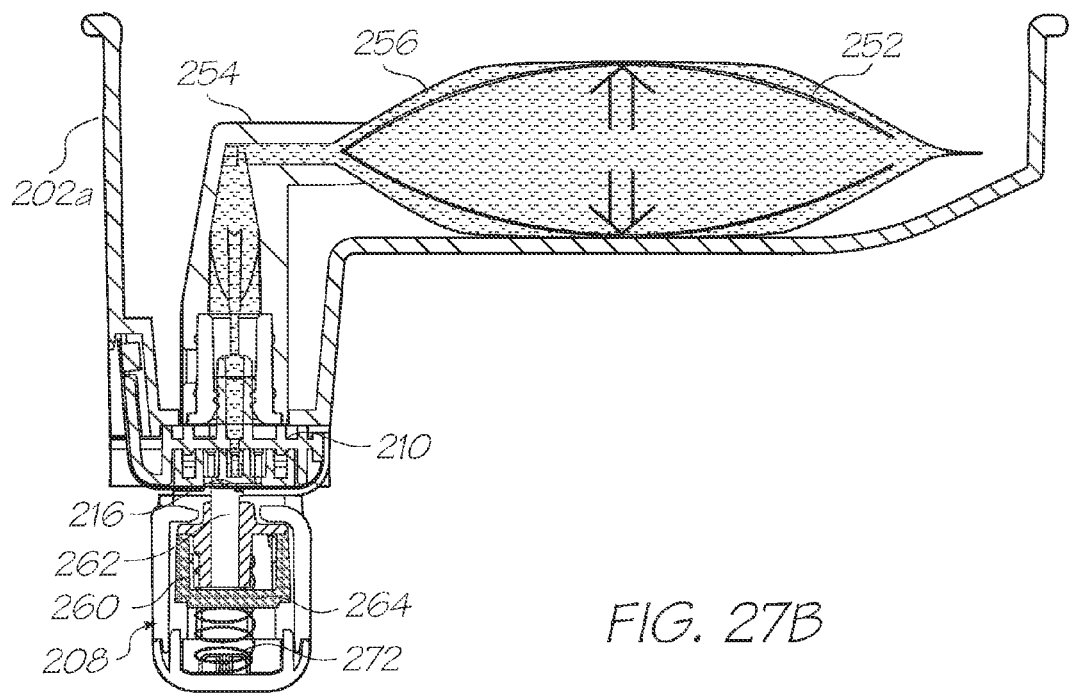
Figure 28:
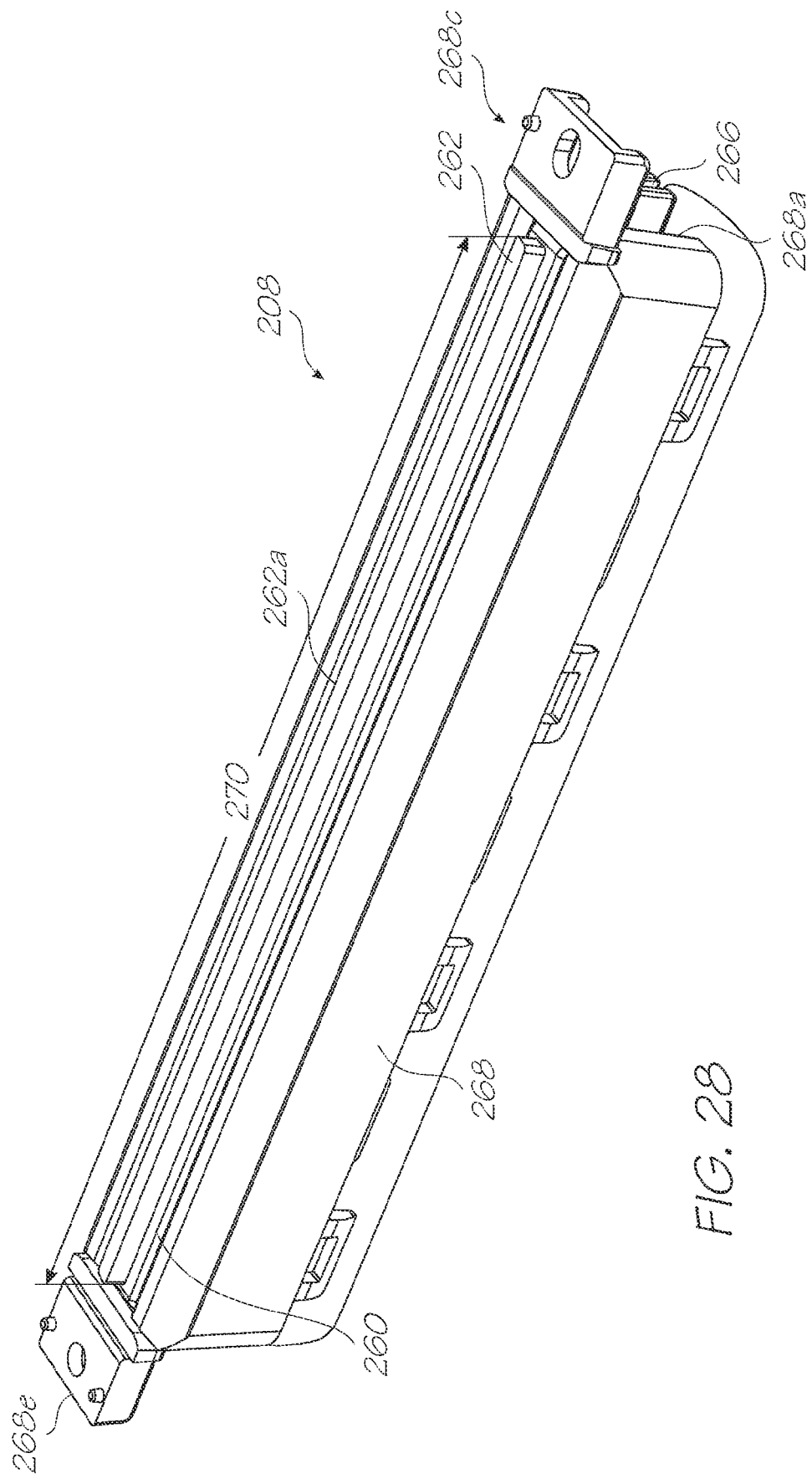
FIG. 28 shows an isolated view of the capper.

As illustrated in FIGS. 27A and 27B, a cap 260 of the capper 208 is at its capping position on the nozzles of the printhead 204 during the priming operation so as to capture any primed ink which is ejected from the nozzles during priming The manner in which the cap of the capper caps the printhead nozzles and the operation of the capper is described in the Applicant's co-pending U.S. patent application Ser. Nos. 11/246,676, 11/246,677, 11/246,678 11/246,679, 11/246,680, 11/246,681, and 11/246,714 , all filed Oct. 11, 2005 and the entire contents of which are hereby incorporated by reference.

For ease of understanding, a brief excerpt of the description provided in these co-pending Applications is now provided.

Referring to FIGS. 27A to 30, the cap 260 of the capper 208 comprises an elastically deformable elongate pad 262 having a contact surface 262a mounted on a elongate support 264 which has lugs or actuation features 266 protruding from each longitudinal end. The support 264 is housed within an elongate housing 268 so that the lugs 266 protrude through slots 268a in the housing at each longitudinal end thereof. The housing is mounted to the ink distribution support 210 of the printhead 204 so as to align the pad 262 of the cap 260 with the printhead ICs 218 and the contact surface 262a of the pad 262 is configured to form a capping zone which is commensurate with the printing zone 219 of the printhead 204. Preferably the housing and support are formed as moldings from plastic or like material.

The support is slidably movable within the slots 268a of the housing 268, allowing the pad 262 to be slid relative to the housing 268. The extent of the pad's slidable movement is defined by the length of the slots 268a due to the contact of the lugs 266 with the slot walls. At the upper extent of movement, the cap 260 is placed in its capping position (see FIG. 28) and at the lower extent of movement, the cap 260 is placed in its non-capping position (see FIG. 30). The range of movement may be from about 1.5 millimeters to about 2.6 millimeters, thereby ensuring unobstructed passage of the print media along the media path 212.

Figure 30:
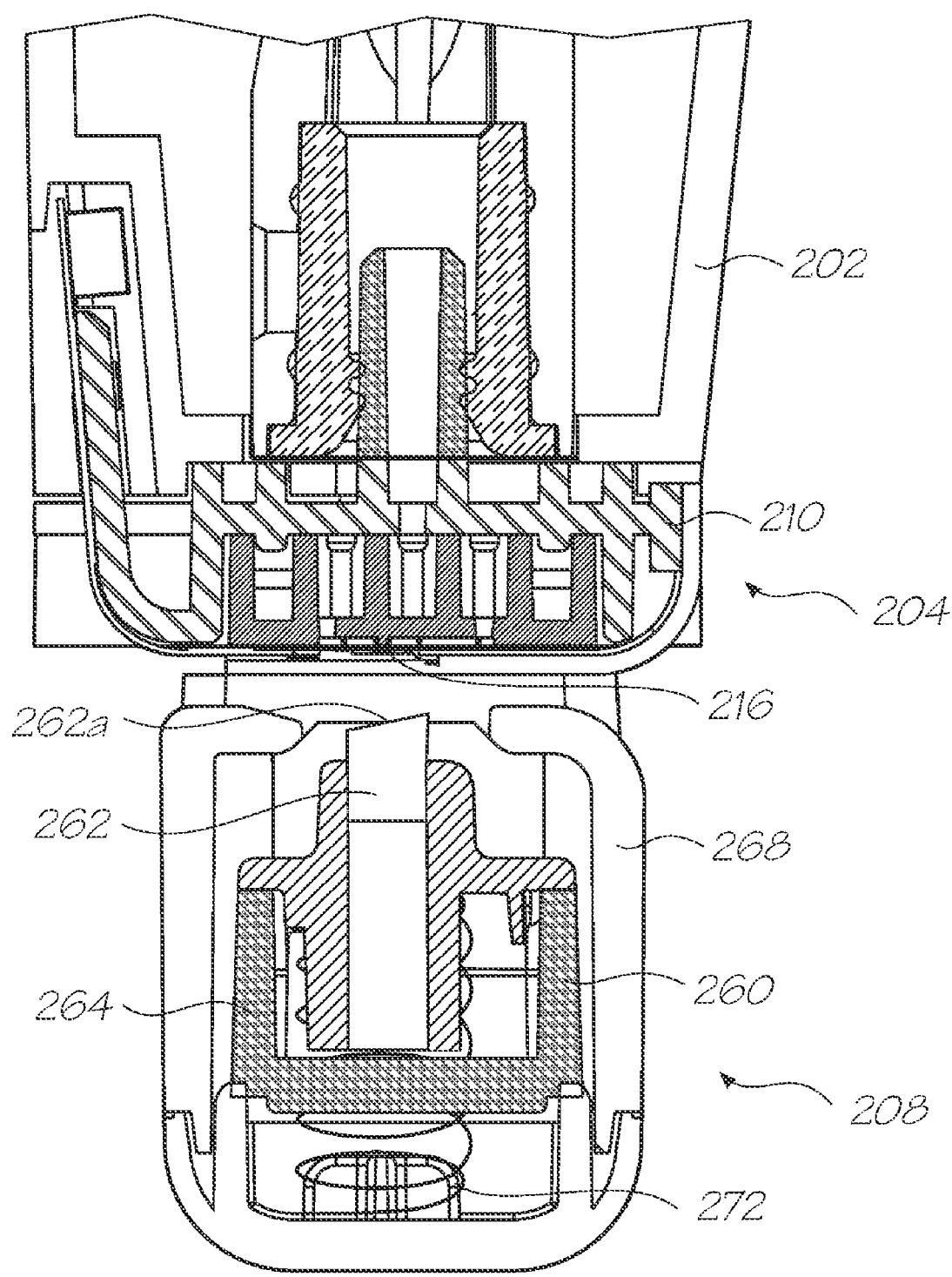
FIG. 30 illustrates a non-capping position of the capper.

A pair of springs 272 is fixed to the bottom wall of the housing 268 to bias the cap 260 into the capping position. In the capping position, the contact surface 262a of the pad 262, which defines the capping zone 270, sealingly engages with the nozzles 214 of the printhead 204 across the entire printing zone 219, thereby capping or covering the nozzles. This capping isolates the ink within the nozzles from the exterior, thereby preventing evaporation of water from the primed ink from the nozzles and the exposure of the nozzles to potentially fouling particulate matter during non-operation of the printhead. In the non-capping position, the contact surface 262a is disengaged from the nozzles, as illustrated in FIG. 30, allowing printing to be performed.

Figure 29:
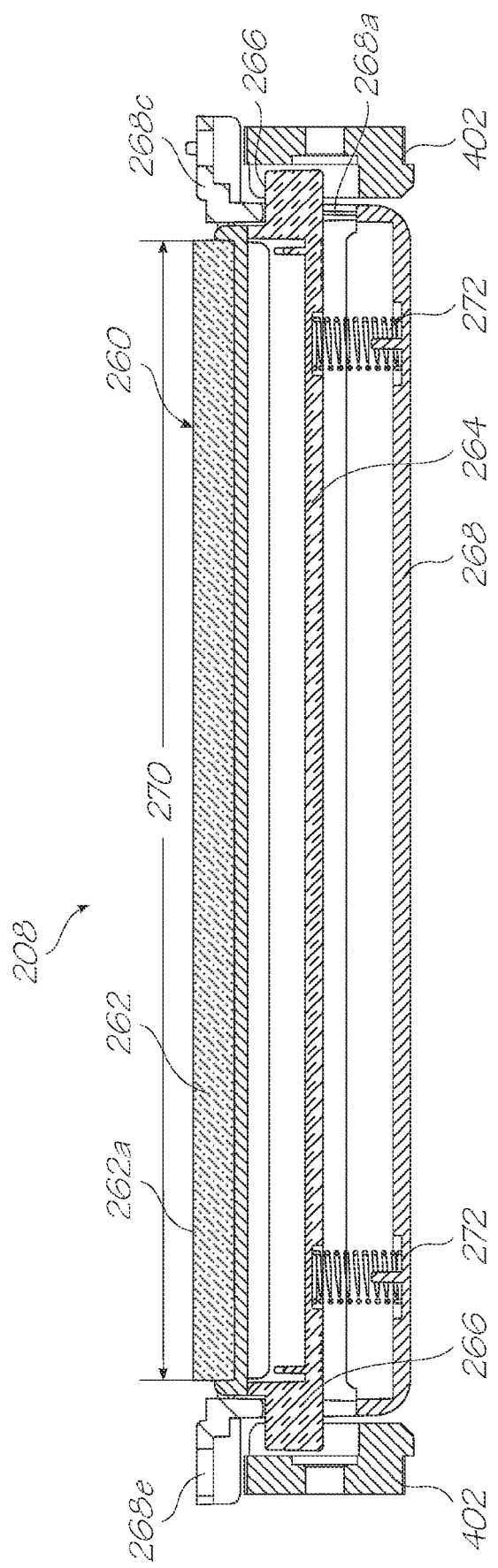
FIG. 29 shows a cross-sectional view of an operational arrangement of actuator features of the capper with a capping mechanism of the printer.

When the printhead cartridge 200 is mounted to the cradle unit 400, the lugs 266 of the support 264 engage with a cam 402 of a capping mechanism of the cradle unit 400, as illustrated in FIG. 29. Rotation of the cam 402, under control of the print control circuitry of the cradle unit 400, causes linear sliding movement of the support 264 and, hence, the pad 262, under control of the springs 272. Accordingly, the pad 262 may be moved reciprocally between its capping position and its non-capping position. The springs 272 are positioned to ensure that all parts of the contact surface 262a of the pad 262 move at the same rate with respect to the printhead 204.

By configuring the capper to be normally capping the printhead in its rest position, i.e., without requiring any electronic mechanism to hold the capper in its capping position, the potential of such an electronic mechanism failing, and therefore uncapping the printhead, is prevented.

As previously mentioned, the linking printhead 216 and capper 208 are commonly mounted to the body 202 of the printhead cartridge 200 via the ink distribution support 210. The ink distribution support 210 is mounted to the cartridge body 202 at mounting zones 210a of the support arranged at either longitudinal end of the printing zone 219 of the linking printhead 216 (see FIG. 14). The mounting zones 210a are formed as widened sections of the upper and lower portion 240,242 of the ink distribution support 210. These widened sections are easily molded as part of the upper and lower moldings.

Figure 31:
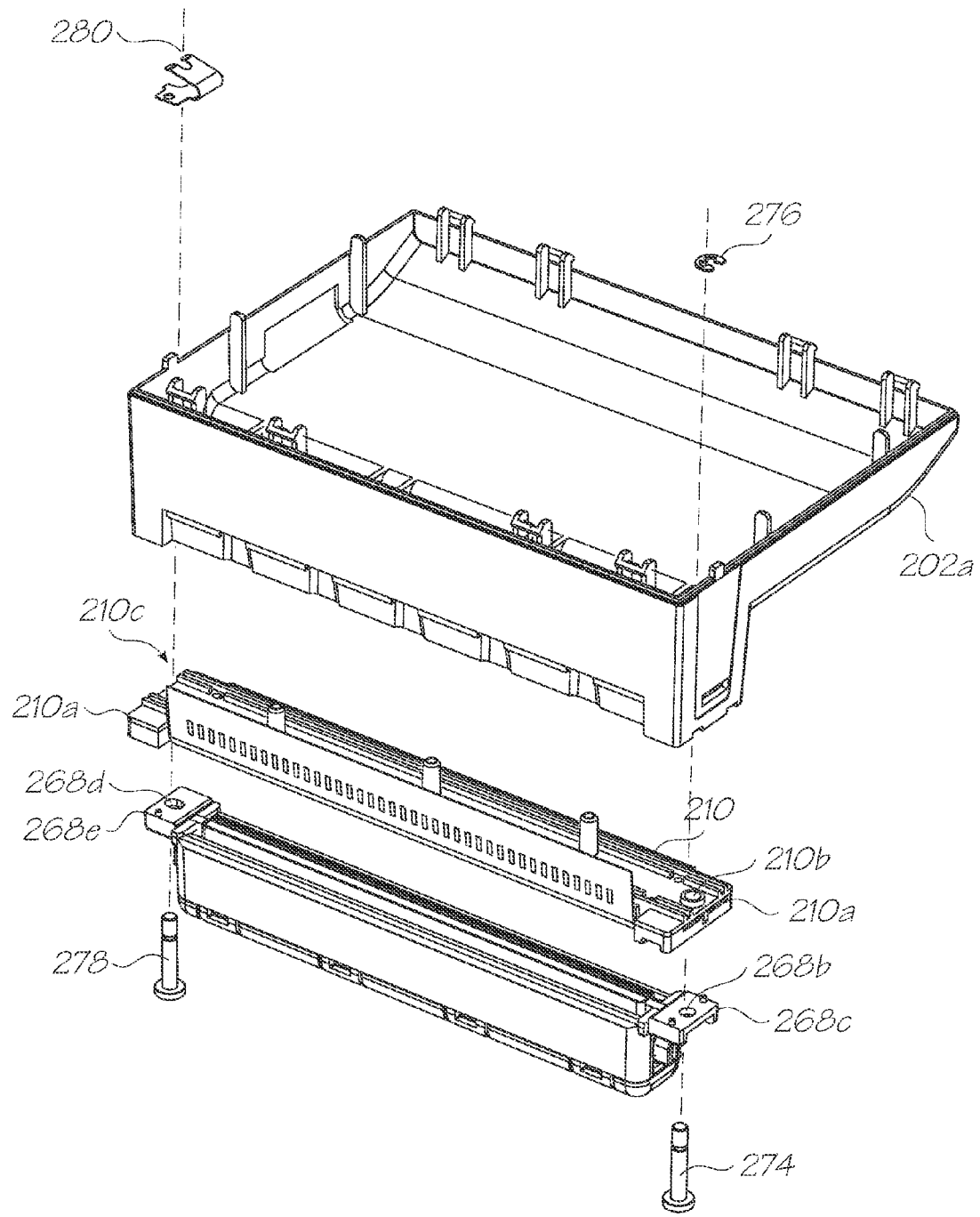
FIG. 31 illustrates assembly of the printhead and capper to a body of the printhead cartridge.
Figure 32:
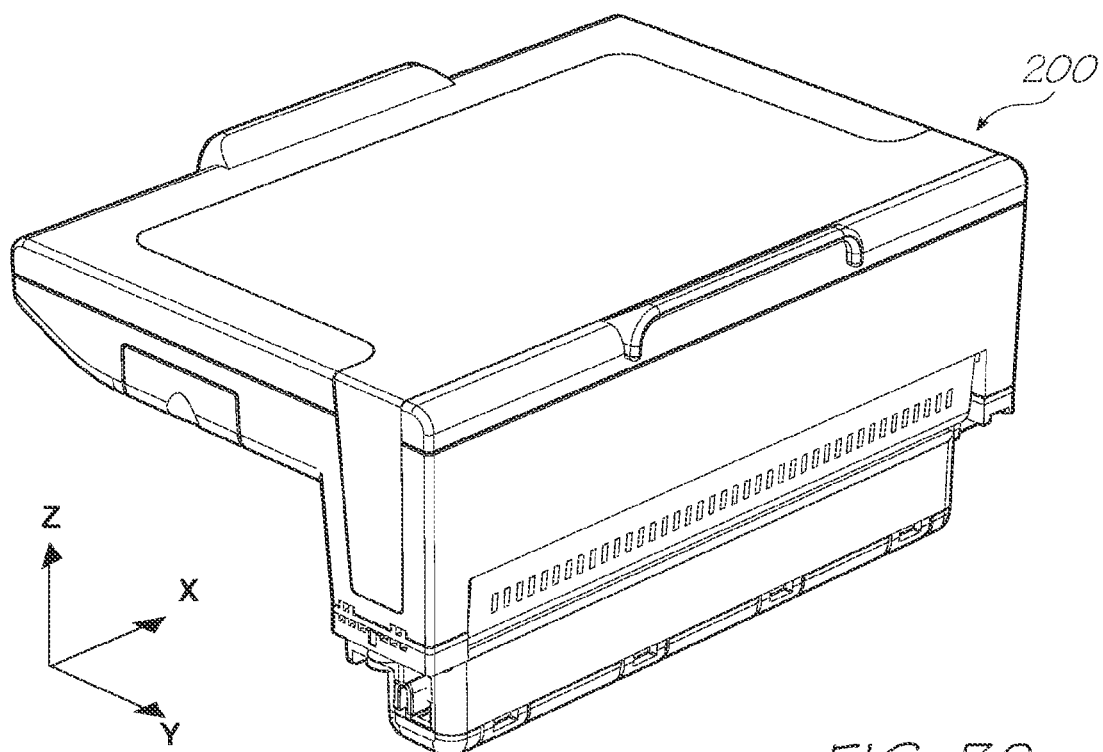
FIG. 32 illustrates a coordinate system of the printhead cartridge.

The mounting zone 210a at one end of the ink distribution support 210 (e.g., the right hand end as depicted in FIG. 31) is formed with a through-hole 210b which aligns with a corresponding through-hole 268b formed in a tab 268c extending from the capper housing 268, as illustrated in FIG. 31. These through-holes 210b,268b of the ink distribution support 210 and capper 208 further align with a similarly positioned through-hole (not shown) provided in the body 202 of the printhead cartridge 200.

The mounting zone 210a at the other end of the ink distribution support 210 (e.g., the left hand end as depicted in FIG. 31) is formed with a slot 210c (see FIG. 14) which aligns with a corresponding slot 268d formed in a tab 268e extending from the capper housing 268, as illustrated in FIG. 31. These slots 210c,268d of the ink distribution support 210 and capper 208 further align with a similarly positioned slot (not shown) provided in the body 202 of the printhead cartridge 200.

A pin 274 is passed through each of the aligned holes at the first end of the printing and capping zones and is locked in place so as to fix the printhead 204 and capper 208 to the cartridge body 202 by a locking member 276, such as a clip (e.g., an E-clip is illustrated).

A second pin 278 is passed through the aligned slots at the second end of the printing and capping zones and is locked in place with a biasing member 280. The biasing member 280 is arranged to bias the cartridge body 202, printhead assembly 204 and capper 208 together at the second pin 278 whilst allowing relative movement of the cartridge body 202, printhead assembly 204 and capper 208. The illustrated biasing member is a sprung clip 280, however other arrangements may be used.

In this way, relative movement of the components of the printhead cartridge 200 is accommodated whilst maintaining a secure mount of, and proper alignment between, the components. In the illustrated embodiment, the slots are configured so as to accommodate movement along the longitudinal direction of the printhead 204 and capper 208 (i.e., in the X-direction of the coordinate system illustrated in FIG. 24). Such longitudinal movement may occur during the performance of printing due to thermal expansion of the linking printhead silicon and the ink distribution support liquid crystal polymer. As well as maintaining alignment, accommodating such thermal expansion alleviates the effect of stresses on the fragile printhead ICs.

Other slotted and/or confining arrangements are possible, so long as proper alignment of the components is maintained throughout the movement accommodated by these arrangements.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

The invention claimed is:

1. A digital photo frame for storing and displaying photos, said digital photo frame comprising:
   a photo-sized display screen rotatably mounted on a support such that said display screen is configurable in landscape-viewing or portrait-viewing orientations by rotation of said screen;
   a memory for storing photo image files tagged as either landscape orientation or portrait orientation;
   a user interface for receiving an instruction to display photos stored in said memory; and
   a processor configured for:
      receiving orientation data regarding an orientation of said display screen;
      retrieving only photo image files from said memory that are tagged with an orientation corresponding to the orientation of said display screen; and
      displaying said retrieved photo image files as photos on said display screen.

2. The digital photo frame of claim 1, wherein said processor is further configured for:
   identifying a tag associated with each photo image file, said tag indicating the orientation of the photo; and storing the photo image files in said memory in accordance with information contained in said tag.

3. The digital photo frame of claim 2, wherein said user interface is configured to allow users to designate either a landscape orientation or a portrait orientation for a displayed image.

4. The digital photo frame of claim 1, wherein said display screen has a length of at least 5 inches and a width of at least 3.5 inches.

5. The digital photo frame of claim 1, further comprising an integral inkjet printer for printing photos displayed on said display screen.

6. The digital photo frame of claim 5, wherein said printer comprises a photo-width printhead.

* * * * *